(12) United States Patent
Soriaga et al.

(10) Patent No.: US 10,505,597 B2
(45) Date of Patent: Dec. 10, 2019

(54) REFERENCE SIGNALS AND LINK ADAPTATION FOR MASSIVE MIMO

(71) Applicant: QUALCOMM Incorporated, San Diego, CA (US)

(72) Inventors: Joseph Binamira Soriaga, San Diego, CA (US); Pavan Kumar Vitthaladevuni, San Diego, CA (US); Can Karakus, Los Angeles, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 15/584,740

(22) Filed: May 2, 2017

(65) Prior Publication Data

US 2017/0324455 A1 Nov. 9, 2017

Related U.S. Application Data

(60) Provisional application No. 62/333,693, filed on May 9, 2016.

(51) Int. Cl.
*H04B 7/0417* (2017.01)
*H04B 7/0456* (2017.01)
(Continued)

(52) U.S. Cl.
CPC ......... *H04B 7/0417* (2013.01); *H04B 7/0421* (2013.01); *H04B 7/0452* (2013.01);
(Continued)

(58) Field of Classification Search
CPC .......... H04B 7/02; H04B 7/0417; H04B 7/06; H04B 7/0617; H04B 7/0626;
(Continued)

(56) References Cited

U.S. PATENT DOCUMENTS 9,160,425 B2  10/2015  Song et al.
2008/0049821 A1  2/2008  Murao
(Continued)

FOREIGN PATENT DOCUMENTS

WO    WO2017166024    * 10/2017

OTHER PUBLICATIONS

Partial International Search Report—PCT/US2017/030793—ISA/EPO—dated Jul. 17, 2017.
(Continued)

*Primary Examiner* — Harun Chowdhury
(74) *Attorney, Agent, or Firm* — Patterson & Sheridan, L.L.P

(57) ABSTRACT

Aspects of the present disclosure relate to wireless communications and, more particularly, to reference signals (RS) and link adaptation for massive multiple-input multiple-output (MIMO). In one aspect, a method is provided which may be performed by a wireless device such as a base station (BS). The method generally includes receiving sounding reference signals (SRS) and at least one of: feedback regarding interference or a whitening matrix from one or more user equipments (UEs), determining beamforming parameters for transmissions to a group of one or more UEs based, at least in part, on the SRS and at least one of: the feedback regarding interference or the whitening matrix, and transmitting channel state information reference signals (CSI-RS) to UEs in the group using the determined beamforming parameters.

20 Claims, 18 Drawing Sheets

(51) Int. Cl.
*H04B 7/0452* (2017.01)
*H04B 7/06* (2006.01)
*H04L 5/00* (2006.01)
*H04L 25/02* (2006.01)
*H04W 72/04* (2009.01)
*H04W 88/02* (2009.01)
*H04W 88/08* (2009.01)
*H04W 76/10* (2018.01)
*H04B 7/0413* (2017.01)

(52) U.S. Cl.
CPC ......... *H04B 7/0456* (2013.01); *H04B 7/0617* (2013.01); *H04B 7/0626* (2013.01); *H04B 7/0691* (2013.01); *H04B 7/0695* (2013.01); *H04L 5/0048* (2013.01); *H04L 25/0202* (2013.01); *H04L 25/0226* (2013.01); *H04W 72/042* (2013.01); *H04W 76/10* (2018.02); *H04W 88/02* (2013.01); *H04W 88/08* (2013.01); *H04B 7/0413* (2013.01); *H04L 5/0037* (2013.01)

(58) Field of Classification Search
CPC .. H04B 7/0632; H04B 7/0421; H04B 7/0695; H04W 72/042; H04W 72/0446
USPC .......................... 370/252, 328, 329, 332, 278
See application file for complete search history.

(56) References Cited

U.S. PATENT DOCUMENTS

| | | | |
|---|---|---|---|
| 2010/0255790 A1 | 10/2010 | Farajidana et al. | |
| 2011/0002406 A1 | 1/2011 | Ming et al. | |
| 2012/0287770 A1* | 11/2012 | Iwai | H04J 13/0062 370/209 |
| 2014/0112168 A1* | 4/2014 | Chen | H04B 7/0413 370/252 |
| 2014/0192917 A1 | 7/2014 | Nam et al. | |
| 2014/0286202 A1* | 9/2014 | Song | H04B 7/0604 370/278 |
| 2015/0055588 A1 | 2/2015 | Yerramalli et al. | |
| 2015/0288483 A1 | 10/2015 | Sun et al. | |
| 2016/0157218 A1 | 6/2016 | Nam et al. | |
| 2016/0329995 A1 | 11/2016 | Jiang et al. | |
| 2017/0047976 A1 | 2/2017 | Noh et al. | |
| 2018/0241454 A1* | 8/2018 | Lee | H04B 7/06 |
| 2019/0013854 A1* | 1/2019 | Kim | H04B 7/02 |
| 2019/0037640 A1* | 1/2019 | Xiong | H04L 1/1861 |

OTHER PUBLICATIONS

International Search Report and Written Opinion—PCT/US2017/030793—ISA/EPO—dated Oct. 12, 2017.

* cited by examiner

REFERENCE SIGNALS AND LINK ADAPTATION FOR MASSIVE MIMO

CROSS-REFERENCE TO RELATED APPLICATION & PRIORITY CLAIM

This application claims benefit of and priority to U.S. Provisional Patent Application Ser. No. 62/333,693, filed May 9, 2016, which is herein incorporated by reference in its entirety for all applicable purposes.

BACKGROUND

Field of the Disclosure

Certain aspects of the present disclosure generally relate to wireless communications and, more particularly, to reference signals (RS) and link adaptation for massive multiple-input multiple-output (MIMO).

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, single-carrier FDMA (SC-FDMA), time division synchronous CDMA (TD-SCDMA), 3rd Generation Partnership Project (3GPP) Long Term Evolution (LTE)/LTE-Advanced (LTE-A) systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations (BSs) that can support communication for a number of wireless devices such as user equipments (UEs). A UE may communicate with a BS via the downlink and uplink. The downlink (or forward link) refers to the communication link from the BS to the UE, and the uplink (or reverse link) refers to the communication link from the UE to the BS. In an NR or 5G networks, the wireless multiple access communication system may include a number of distributed units (e.g., edge units (EUs), edge nodes (ENs), radio heads (RHs), smart radio heads (SRHs), transmission reception points (TRPs), etc.) in communication with a number of central units (e.g., CU, central nodes (CNs), access node controllers (ANCs), etc.), where a set of one or more distributed units (DUs), in communication with a CU, may define an access node (e.g., AN, NR BS, NR NB, 5G NB, network node, gNB, access point (AP), transmission reception point (TRP), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is Long Term Evolution (LTE). NR is a set of enhancements to the LTE mobile standard promulgated by 3GPP. NR is designed to better support mobile broadband Internet access by improving spectral efficiency, lower costs, improve services, make use of new spectrum, and better integrate with other open standards using OFDMA with a cyclic prefix on the downlink and on the uplink, as well as supporting beamforming, multiple-input multiple-output (MIMO) antenna technology, and carrier aggregation. However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to reference signals (RS) and link adaptation for massive multiple-input multiple-output (MIMO).

Certain aspects of the present disclosure provide a method, performed by a wireless node such as a base station (BS). The method generally includes receiving sounding reference signals (SRS) and at least one of: feedback regarding interference or a whitening matrix from one or more user equipments (UEs), determining beamforming parameters for transmissions to a group of one or more UEs based, at least in part, on the SRS and at least one of: the feedback regarding interference or the whitening matrix, and transmitting channel state information reference signals (CSI-RS) to UEs in the group using the determined beam forming parameters.

Certain aspects of the present disclosure provide a method, performed by a wireless node such as a UE. The method generally includes transmitting SRS and at least one of: feedback regarding interference or a whitening matrix to a BS, receiving beamformed CSI-RS from the BS, determining CSI feedback based on the beamformed CSI-RS, and transmitting the CSI feedback to the BS.

Certain aspects of the present disclosure provide a method, performed by a wireless node such as a UE. The method generally includes transmitting one or more SRS to a BS; receiving a data packet from the BS; and reporting demodulation quality feedback to the BS based on the received data packet.

Certain aspects of the present disclosure provide a method, performed by a wireless node such as a BS. The method generally includes receiving one or more SRS from a UE; transmitting a data packet to the UE; receiving demodulation quality feedback from the UE based on the data packet; and selecting at least one of: a modulation scheme or a coding rate for transmitting to the UE based on the demodulation quality feedback.

Certain aspects of the present disclosure provide an apparatus, such as a BS. The apparatus generally includes means for receiving SRS and at least one of: feedback regarding interference or a whitening matrix from one or more UEs, means for determining beamforming parameters for transmissions to a group of one or more UEs based, at least in part, on the SRS and at least one of: the feedback regarding interference or the whitening matrix, and means for transmitting CSI-RS to UEs in the group using the determined beam forming parameters.

Certain aspects of the present disclosure provide an apparatus such as a UE. The apparatus generally includes means for transmitting SRS and at least one of: feedback regarding interference or a whitening matrix to a BS, means for receiving beamformed CSI-RS from the BS, means for determining CSI feedback based on the beamformed CSI-RS, and means for transmitting the CSI feedback to the BS.

Certain aspects of the present disclosure provide an apparatus such as a UE. The apparatus generally includes means for transmitting one or more SRS to a BS; means for receiving a data packet from the BS; and means for reporting demodulation quality feedback to the BS based on the received data packet.

Certain aspects of the present disclosure provide an apparatus such as a BS. The apparatus generally includes means for receiving one or more SRS from a UE; means for transmitting a data packet to the UE; means for receiving demodulation quality feedback from the UE based on the data packet; and means for selecting at least one of: a modulation scheme or a coding rate for transmitting to the UE based on the demodulation quality feedback.

Certain aspects of the present disclosure provide an apparatus, such as a BS. The apparatus generally includes a receiver configured to receive SRS and at least one of: feedback regarding interference or a whitening matrix from one or more UEs, at least one processor coupled with a memory and configured to determine beamforming parameters for transmissions to a group of one or more UEs based, at least in part, on the SRS and at least one of: the feedback regarding interference or the whitening matrix, and a transmitter configured to transmit CSI-RS to UEs in the group using the determined beam forming parameters.

Certain aspects of the present disclosure provide an apparatus such as a UE. The apparatus generally includes a transmitter configured to transmit SRS and at least one of: feedback regarding interference or a whitening matrix to a BS, a receiver configured to receive beamformed CSI-RS from the BS, at least one processor coupled with a memory and configured to determine CSI feedback based on the beamformed CSI-RS, wherein the transmitter is further configured to transmit the CSI feedback to the BS.

Certain aspects of the present disclosure provide an apparatus such as a UE. The apparatus generally includes a transmitter configured to transmit one or more SRS to a BS; a receiver configured to receive a data packet from the BS; and at least one processor coupled with a memory and configured to report demodulation quality feedback to the BS based on the received data packet.

Certain aspects of the present disclosure provide an apparatus such as a BS. The apparatus generally includes a receiver configured to receive one or more SRS from a UE; a transmitter configured to transmit a data packet to the UE, wherein the receiver is further configured to receive demodulation quality feedback from the UE based on the data packet; and at least one processor coupled with a memory and configured to select at least one of: a modulation scheme or a coding rate for transmitting to the UE based on the demodulation quality feedback.

Certain aspects of the present disclosure provide a computer readable medium having computer executable code stored thereon for wireless communications by a BS. The computer executable code generally includes code for receiving SRS and at least one of: feedback regarding interference or a whitening matrix from one or more UEs, code for determining beamforming parameters for transmissions to a group of one or more UEs based, at least in part, on the SRS and at least one of: the feedback regarding interference or the whitening matrix, and code for transmitting CSI-RS to UEs in the group using the determined beam forming parameters.

Certain aspects of the present disclosure provide a computer readable medium having computer executable code stored thereon for wireless communications by a UE. The computer executable code generally includes code for transmitting SRS and at least one of: feedback regarding interference or a whitening matrix to a BS, code for receiving beamformed CSI-RS from the BS, code for determining CSI feedback based on the beamformed CSI-RS, and code for transmitting the CSI feedback to the BS.

Certain aspects of the present disclosure provide a computer readable medium having computer executable code stored thereon for wireless communications by a UE. The computer executable code generally includes code for transmitting one or more SRS to a BS; code for receiving a data packet from the BS; and code for reporting demodulation quality feedback to the BS based on the received data packet.

Certain aspects of the present disclosure provide a computer readable medium having computer executable code stored thereon for wireless communications by a BS. The computer executable code generally includes code for receiving one or more SRS from a UE; code for transmitting a data packet to the UE; code for receiving demodulation quality feedback from the UE based on the data packet; and code for selecting at least one of: a modulation scheme or a coding rate for transmitting to the UE based on the demodulation quality feedback.

Other aspects, features, and embodiments of the present invention will become apparent to those of ordinary skill in the art, upon reviewing the following description of specific, exemplary aspects of the present invention in conjunction with the accompanying figures. While features of the present disclosure may be discussed relative to certain aspects and figures below, all embodiments of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
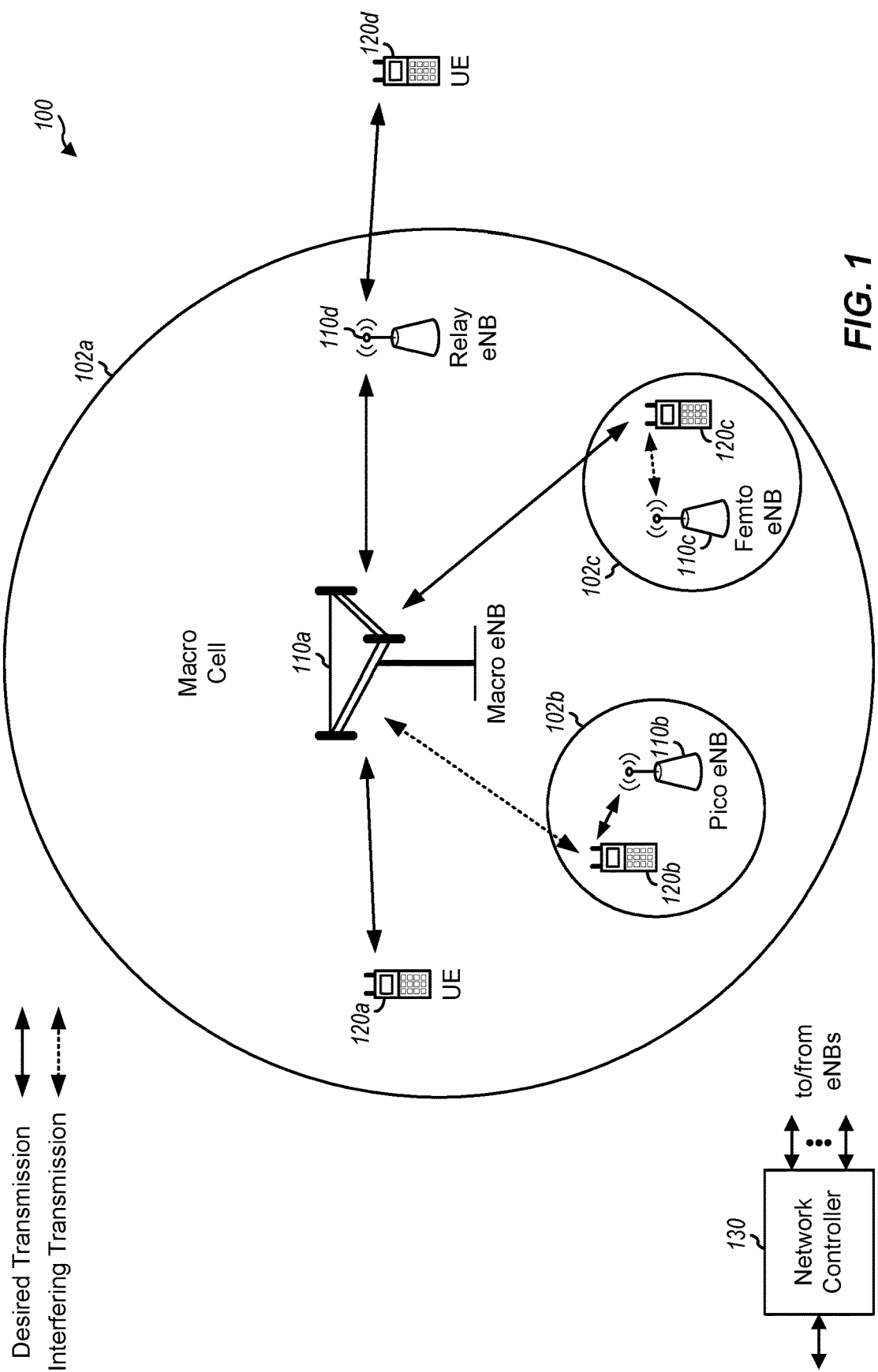
FIG. 1 is a block diagram conceptually illustrating an example of a wireless communication system, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure provide apparatus, methods, processing systems, and computer program products for new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). NR may support carrier aggregation (CA).

Aspects of the present disclosure relate to reference signals (RS) and link adaptation for massive multiple-input multiple-output (MIMO). According to certain aspects, a base station (BS) may be configured to receive sounding reference signals (SRS) and interference information from one or more user equipments (UEs) and determine beamforming parameters (e.g., such as UE grouping, preocoders, and/or spatial streams) for transmissions to a group of one or more UEs based, at least in part, on the SRS. The BS transmits channel state information reference signals (CSI-RS) to the UEs in the group according to the determined beamforming parameters.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development in conjunction with the 5G Technology Forum (5GTF). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

It is noted that while aspects may be described herein using terminology commonly associated with 3G and/or 4G wireless technologies, aspects of the present disclosure can be applied in other generation-based communication systems, such as NR including 5G and later.

EXAMPLE WIRELESS COMMUNICATIONS NETWORK

FIG. 1 illustrates an example wireless communication system 100, in which aspects of the present disclosure may be practiced. Techniques presented herein may be used for transmission of reference signals and for link adaptation in massive multiple-input multiple-output (MIMO), by a wireless device. For example, BS 110 may receive sounding reference signals (SRS) and interference information from one or more of the user equipments (UEs) 120. The BS 110 may determine beamforming parameters for transmissions to a group of the UEs 120 based, at least in part, on the SRS. The BS 110 may transmit channel state information reference signals (CSI-RS) to the UEs 120 according to the determined beamforming parameters.

Wireless communication system 100 may be an LTE network or some other wireless network, such as an NR or 5G network. Wireless communication system 100 may include a number of BSs 110 and other network entities. A BS is an entity that communicates with UEs and may also be referred to as a Node B, enhanced/evolved NB (eNB), 5G NB, gNB, access point (AP), transmission reception point (TRP), etc.

Each BS may provide communication coverage for a particular geographic area. In 3GPP, the term "cell" can refer to a coverage area of a BS and/or a BS subsystem serving this coverage area, depending on the context in which the term is used.

Wireless communication system 100 may be a heterogeneous network that includes BSs of different types, e.g., macro BSs, pico BSs, femto BSs, relay Bss, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, BS 110a may be a macro BS for a macro cell 102a, BS 110b may be a pico BS for a pico cell 102b, and BS 110c may be a femto BS for a femto cell 102c. A BS may support one or multiple (e.g., three) cells. The terms "eNB", "base station" and "cell" may be used interchangeably herein.

Wireless communication system 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay eNB, a relay base station, a relay, etc.

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be A UE may be a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

A UE may be located within the coverage of multiple BSs. One of these eNBs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
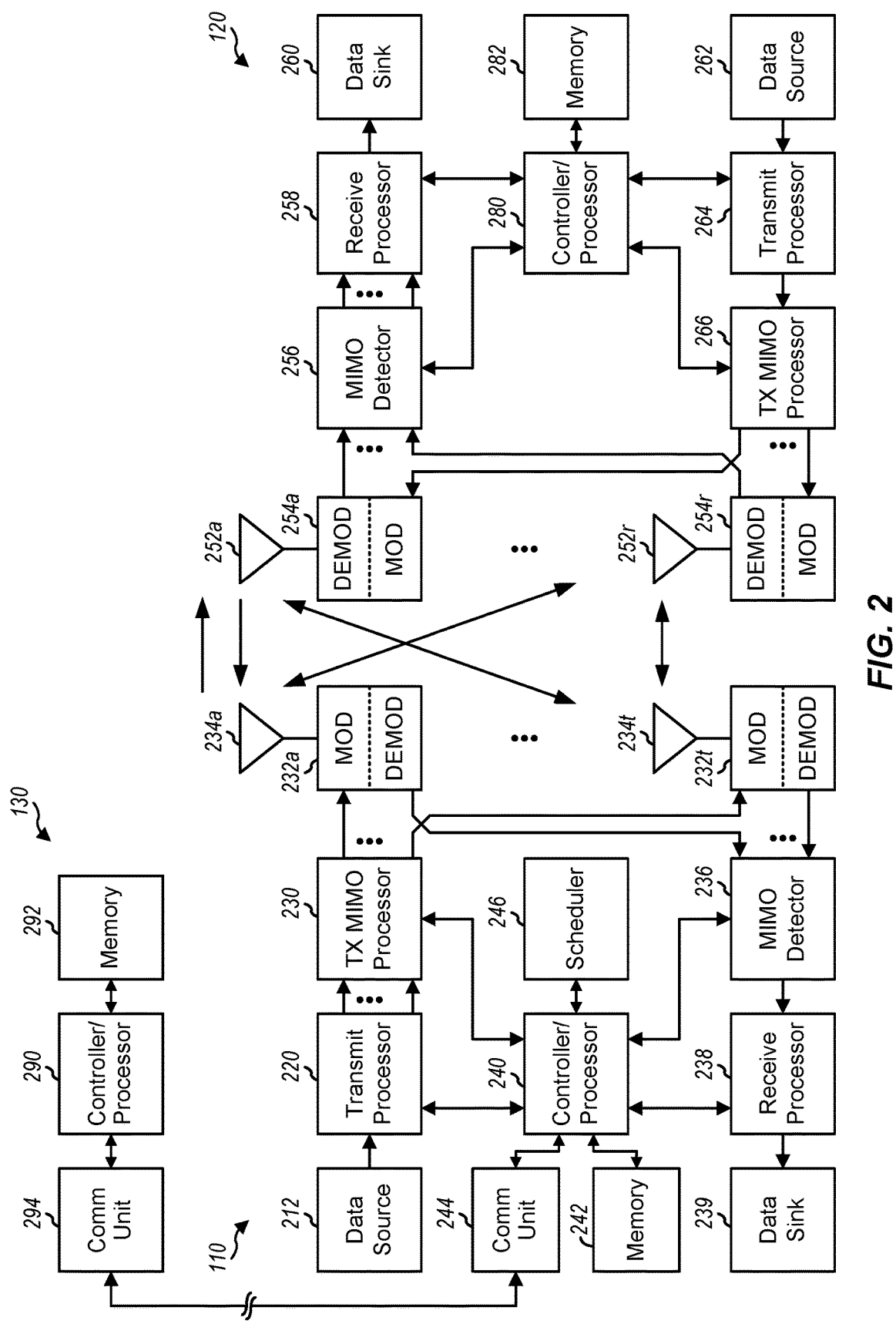
FIG. 2 shows a block diagram conceptually illustrating an example of a base station (BS) in communication with a user equipment (UE) in a wireless communications system, in accordance with certain aspects of the present disclosure.

FIG. 2 shows a block diagram of a design of BS 110 and UE 120, which may be one of the BSs and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for static resource partitioning information (SRPI), etc.) and control information (e.g., channel quality information (CQI) requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240 BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively, to perform techniques presented herein for reference signals and link adaptation for massive MIMO. For example, processor 240 and/or other processors and modules at BS 110, and processor 280 and/or other processors and modules at UE 120, may perform or direct operations of BS 110 and UE 120, respectively. For example, controller/processor 280 and/or other controllers/processors and modules at UE 120, and controller/processor 240 and/or other controllers/processors and modules at BS 110 may perform or direct operations described herein. Memories 242 and 282 may store data and program codes BS 110 and UE 120, respectively. A scheduler 246 may schedule UEs for data transmission on the downlink and/or uplink.

Figure 3:
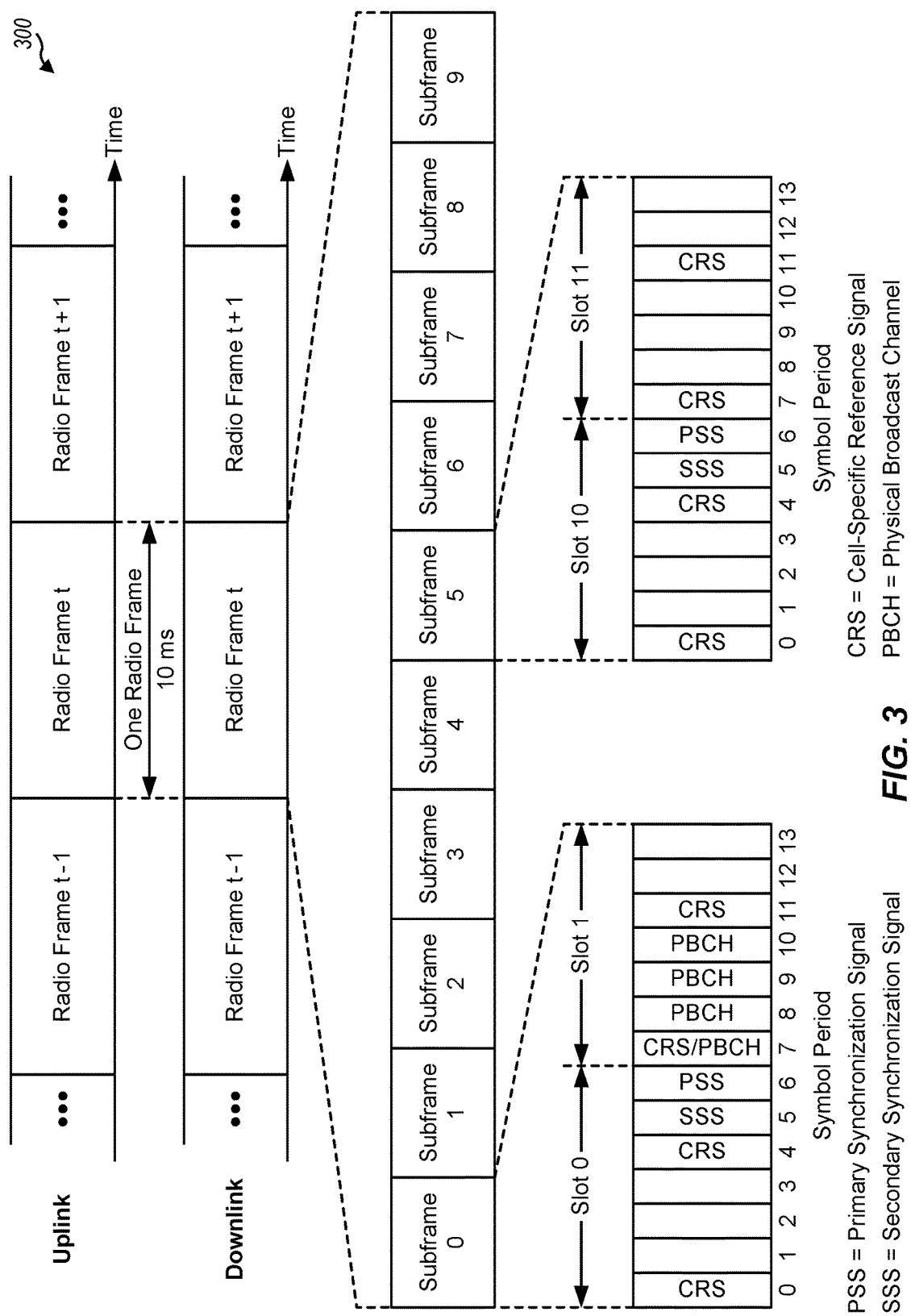
FIG. 3 is a block diagram conceptually illustrating an example of a frame structure in a wireless communications network, in accordance with certain aspects of the present disclosure.

FIG. 3 shows an exemplary frame structure 300 for frequency division duplexing (FDD) in certain systems (e.g., wireless communication system 100). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In certain system, a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

Figure 4:
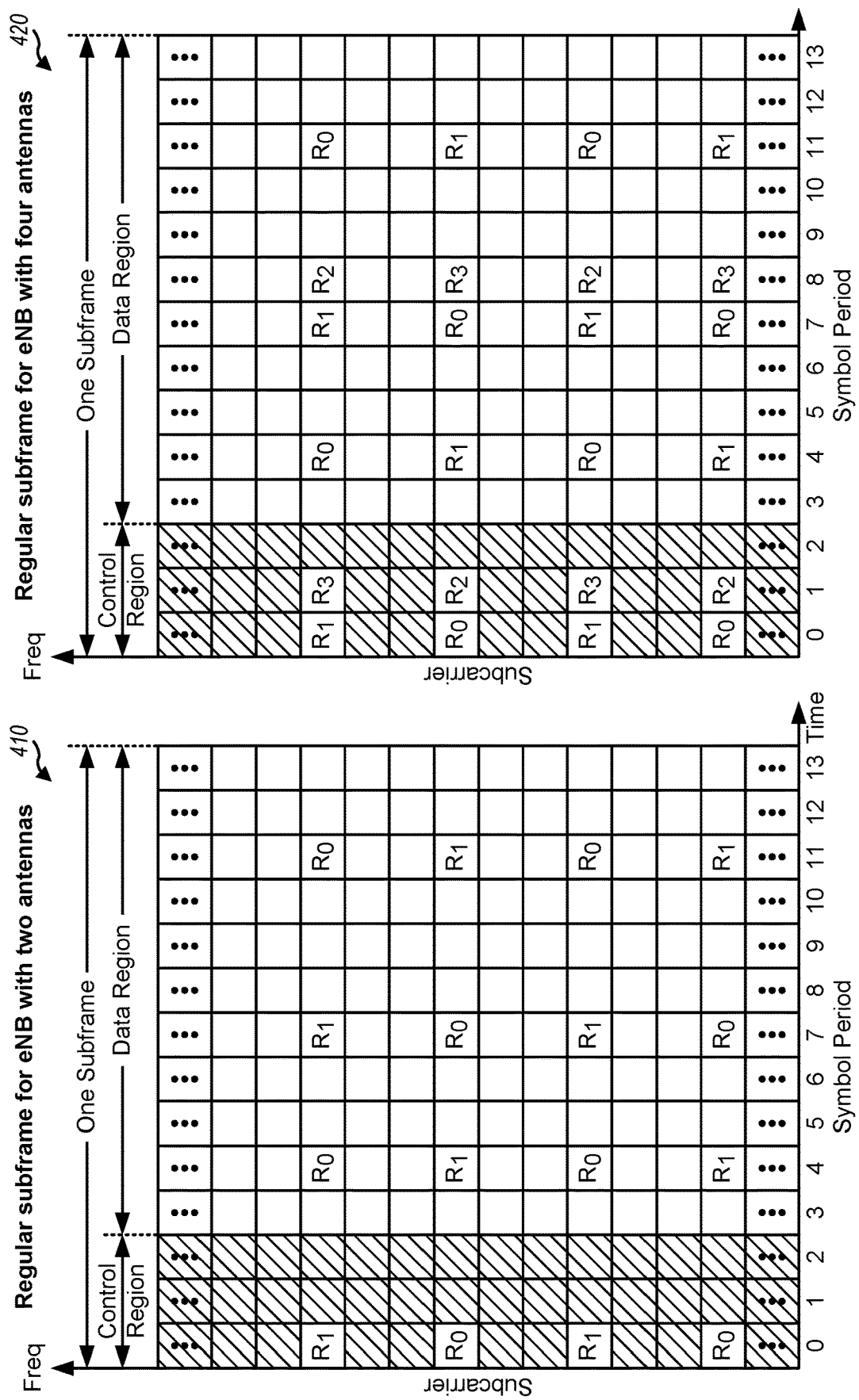
FIG. 4 is a block diagram conceptually illustrating two exemplary subframe formats with the normal cyclic prefix

FIG. 4 shows two exemplary subframe formats 410 and 420 with the normal cyclic prefix. The available time frequency resources may be partitioned into resource blocks (RBs). Each RB may cover 12 subcarriers in one slot and may include a number of resource elements (REs). Each RE may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given RE with label Ra, a modulation symbol may be transmitted on that resource element from antenna a, and no modulation symbols may be transmitted on that RE from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, a+2Q, etc., where q∈(0, . . . , Q−1).

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

Figure 5:
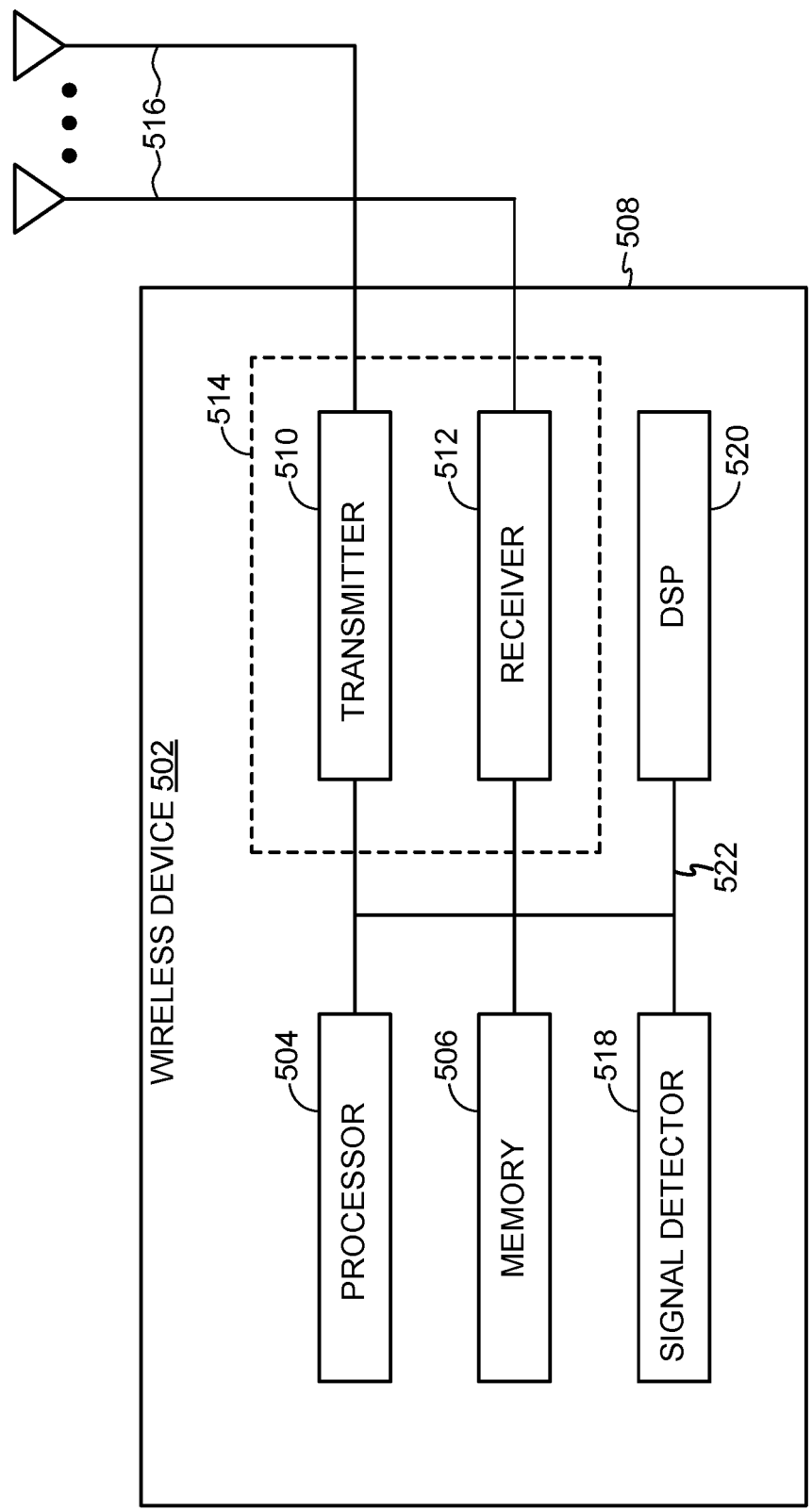
FIG. 5 illustrates various components that may be utilized in a wireless device, in accordance with certain aspects of the present disclosure.

FIG. 5 illustrates various components that may be utilized in a wireless device 502 that may be employed within the wireless communication system 100 illustrated in FIG. 1. The wireless device 502 is an example of a device that may be configured to implement the various methods described herein. The wireless device 502 may be a BS 110 or any of the wireless nodes (e.g., UE 120). For example, the wireless device 502 may be configured to perform operations described herein.

The wireless device 502 may include a processor 504 that controls operation of the wireless device 502. The processor 504 may also be referred to as a central processing unit (CPU). Memory 506, which may include both read-only memory (ROM) and random access memory (RAM), provides instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable to implement the methods described herein, for example, to allow a UE to transmit data efficiently during a connectionless access. Some non-limiting examples of the processor 504 may include Snapdragon processor, application specific integrated circuits (ASICs), programmable logic, etc.

The wireless device 502 may also include a housing 508 that may include a transmitter 510 and a receiver 512 to allow transmission and reception of data between the wireless device 502 and a remote location. The transmitter 510 and receiver 512 may be combined into a transceiver 514. A single transmit antenna or a plurality of transmit antennas 516 may be attached to the housing 508 and electrically coupled to the transceiver 514. The wireless device 502 may also include (not shown) multiple transmitters, multiple receivers, and multiple transceivers. The wireless device 502 can also include wireless battery charging equipment.

The wireless device 502 may also include a signal detector 518 that may be used in an effort to detect and quantify the level of signals received by the transceiver 514. The signal detector 518 may detect such signals as total energy, energy per subcarrier per symbol, power spectral density and other signals. The wireless device 302 may also include a digital signal processor (DSP) 520 for use in processing signals.

The various components of the wireless device 502 may be coupled together by a bus system 522, which may include a power bus, a control signal bus, and a status signal bus in addition to a data bus. The processor 504 may be configured to access instructions stored in the memory 506 to perform connectionless access, in accordance with aspects of the present disclosure discussed below.

Example NR/5G RAN Architecture

In NR networks, a single component carrier bandwidth of 100 MHz may be supported. NR resource blocks (RBs) may span 12 subcarriers with a subcarrier bandwidth of 75 kHz over a 0.1 ms duration. Each radio frame may consist of 50 subframes (or slots) with a length of 10 ms. Consequently, each subframe may have a length of 0.2 ms. Each subframe may indicate a link direction (i.e., downlink, uplink or sidelink) for data transmission and the link direction for each subframe may be dynamically switched. Each subframe may include DL/UL data as well as DL/UL control data. UL and DL subframes for NR may be as described in more detail below with respect to FIGS. 8 and 9.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units (CUs) or distributed units (DUs).

The NR radio access network (RAN) may include a CU and one or more DUs. A NR BS (e.g., referred to as a gNB, 5G Node B, NB, eNB, transmission reception point (TRP), access point (AP), etc.) may correspond to one or multiple BSs. NR cells can be configured (e.g., by the RAN) as access cells (ACells) or data only cells (DCells). DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 6:
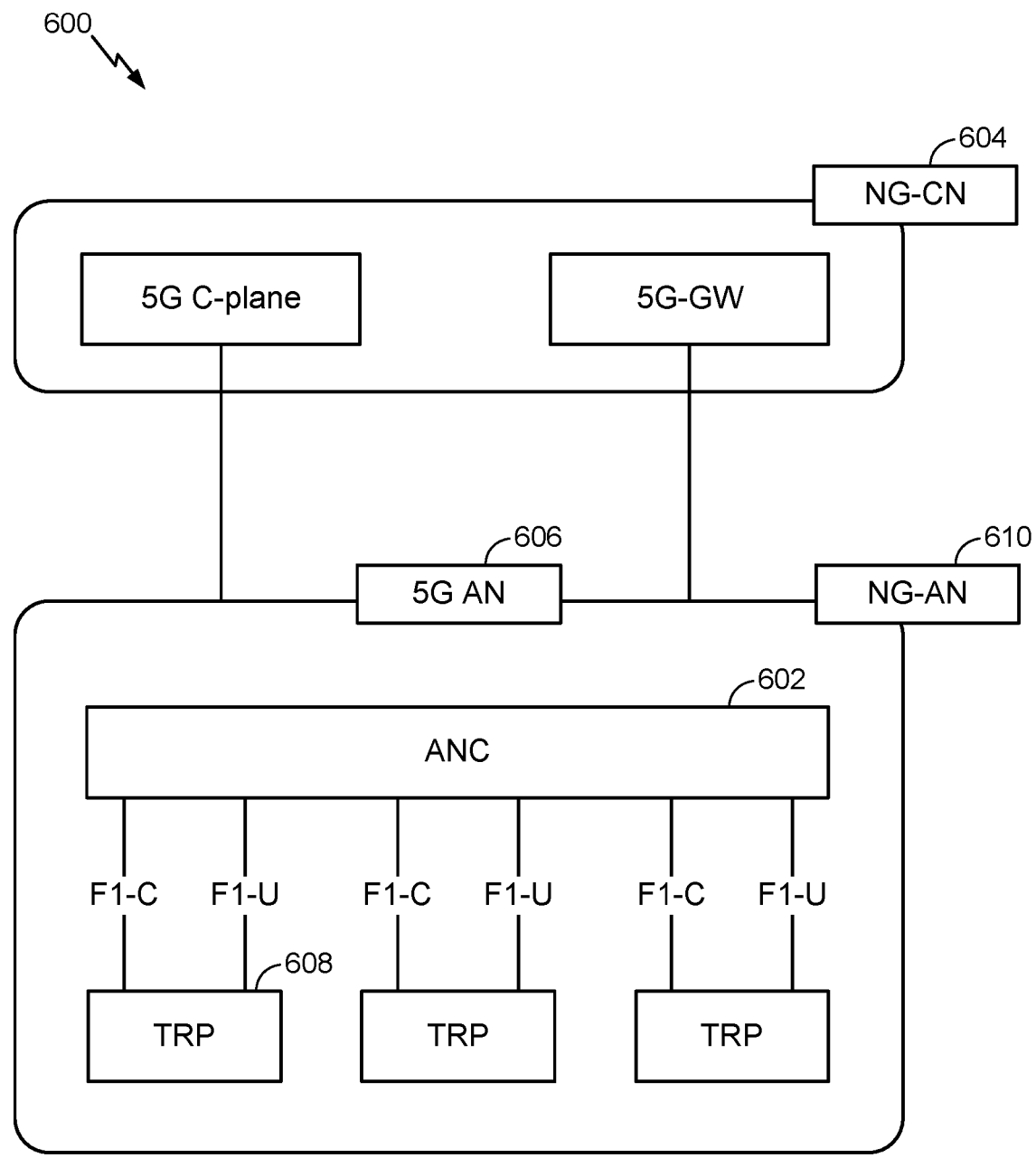
FIG. 6 illustrates an example logical architecture of a distributed radio access network (RAN), in accordance with certain aspects of the present disclosure.

FIG. 6 illustrates an example logical architecture of a distributed RAN 600, according to aspects of the present disclosure. A 5G access node 606 may include an access node controller (ANC) 602. ANC 602 may be a CU of the distributed RAN 600. The backhaul interface to the next generation core network (NG-CN) 604 may terminate at ANC 602. The backhaul interface to neighboring next generation access nodes (NG-ANs) 610 may terminate at ANC 602. ANC 602 may include one or more TRPs 608.

TRPs 608 may be a DU. TRPs 608 may be connected to one ANC (e.g., ANC 602) or more than one ANC (not illustrated). For example, for RAN sharing, radio as a service (RaaS), and service specific AND deployments, the TRP may be connected to more than one ANC. A TRP may include one or more antenna ports. TRPs 608 may be configured to individually (e.g., dynamic selection) or jointly (e.g., joint transmission) serve traffic to a UE.

The logical architecture of the distributed RAN 600 may support fronthauling solutions across different deployment types. For example, the architecture may be based on transmit network capabilities (e.g., bandwidth, latency, and/or jitter). The logical architecture of the distributed RAN 600 may share features and/or components with LTE. For example, the NG-AN 610 may support dual connectivity with NR. NG-AN 610 may share a common fronthaul for LTE and NR.

The logical architecture of distributed RAN 600 may enable cooperation between and among TRPs 608. For example, cooperation may be within a TRP and/or across TRPs via ANC 602. An inter-TRP interface may not be present.

The logical architecture of a distributed RAN 600 may include a dynamic configuration of split logical functions. For example, packet data convergence protocol (PDCP), radio link control (RLC) protocol, and/or medium access control (MAC) protocol may be adaptably placed at ANC 602 or TRP 608.

Figure 7:
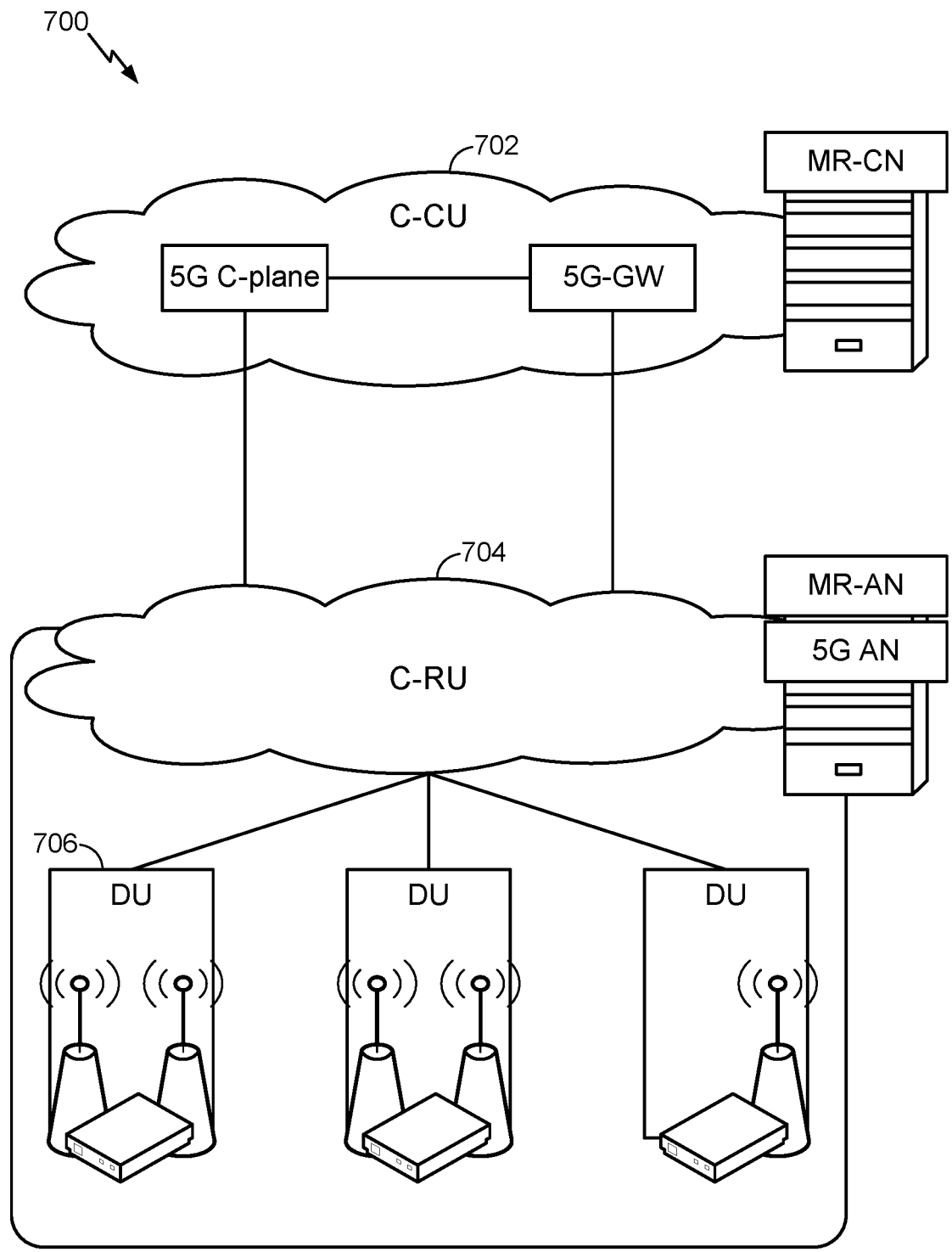
FIG. 7 illustrates an example physical architecture of a distributed RAN, in accordance with certain aspects of the present disclosure.

FIG. 7 illustrates an example physical architecture of a distributed RAN 700, according to aspects of the present disclosure. A centralized core network unit (C-CU) 702 may host core network functions. C-CU 702 may be centrally deployed. C-CU 702 functionality may be offloaded (e.g., to advanced wireless services (AWS)), in an effort to handle peak capacity. A centralized RAN unit (C-RU) 704 may host one or more ANC functions. Optionally, C-RU 704 may host core network functions locally. C-RU 704 may have distributed deployment. C-RU 704 may be located near the network edge. DU 706 may host one or more TRPs. DU 706 may be located at edges of the network with radio frequency (RF) functionality.

Figure 8:
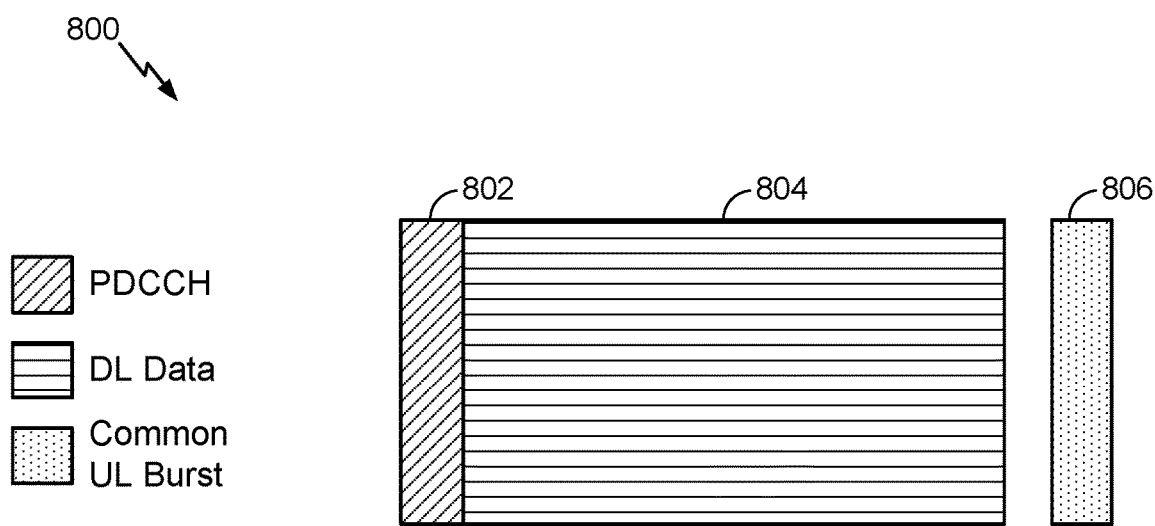
FIG. 8 is a diagram illustrating an example of a downlink-centric slot, in accordance with certain aspects of the present disclosure.

FIG. 8 is a diagram showing an example of a DL-centric slot 800. DL-centric slot 800 may include a control portion 802. The control portion 802 may exist in the initial or beginning portion of DL-centric slot 800. The control portion 802 may include various scheduling information and/or control information corresponding to various portions of DL-centric slot 800. In some configurations, the control portion 802 may be a physical DL control channel (PDCCH), as shown in FIG. 8. DL-centric slot 800 may also include a DL data portion 804. The DL data portion 804 may be referred to as the payload of DL-centric slot 800. The DL data portion 804 may include the communication resources utilized to communicate DL data from the scheduling entity (e.g., UE or BS) to the subordinate entity (e.g., UE). In some configurations, the DL data portion 804 may be a physical DL shared channel (PDSCH).

DL-centric slot 800 may also include a common UL portion 806. The common UL portion 806 may sometimes be referred to as an UL burst, a common UL burst, and/or various other suitable terms. The common UL portion 806 may include feedback information corresponding to various other portions of DL-centric slot 800. For example, the common UL portion 806 may include feedback information corresponding to the control portion 802. Non-limiting examples of feedback information may include an ACK signal, a NACK signal, a HARQ indicator, and/or various other suitable types of information. The common UL portion 806 may include additional or alternative information, such as information pertaining to random access channel (RACH) procedures, scheduling requests (SRs), and various other suitable types of information. As illustrated in FIG. 8, the end of the DL data portion 804 may be separated in time from the beginning of the common UL portion 806. This time separation may be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric slot and alternative structures having similar features may exist without necessarily deviating from the aspects described herein.

Figure 9:
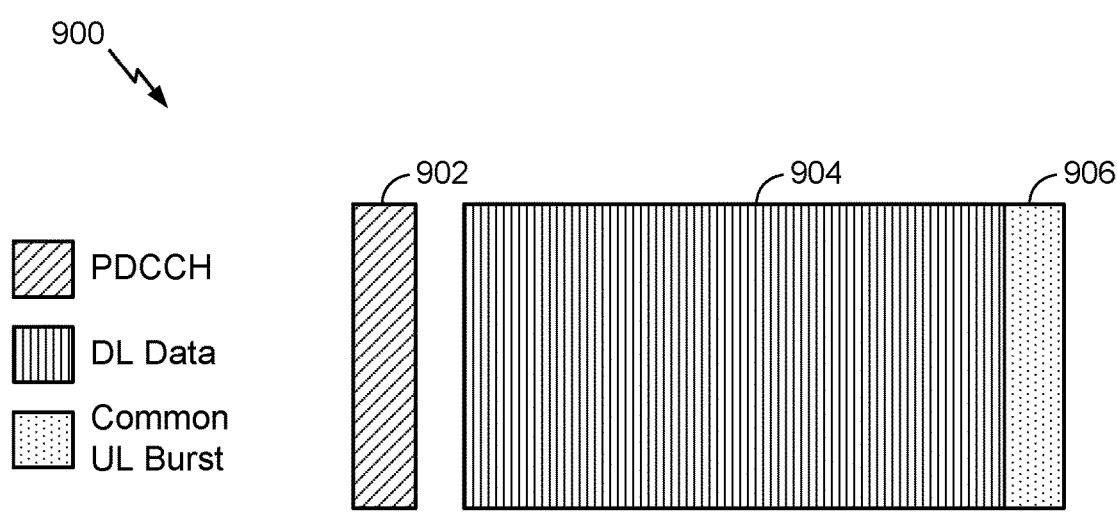
FIG. 9 is a diagram illustrating an example of an uplink-centric slot, in accordance with certain aspects of the present disclosure.

FIG. 9 is a diagram showing an example of an UL-centric slot 900. UL-centric slot 900 may include a control portion 902. The control portion 902 may be located in the initial or beginning portion of UL-centric slot 900. The control portion 902 in FIG. 9 may be similar to the control portion 802 described above with reference to FIG. 8. UL-centric slot 900 may also include an UL data portion 904. The UL data portion 904 may be referred to as the payload of UL-centric slot 900. The UL portion may refer to the communication resources utilized to communicate UL data from the subordinate entity (e.g., UE) to the scheduling entity (e.g., UE or BS). In some configurations, the control portion 902 may be a physical UL shared channel (PUSCH).

As illustrated in FIG. 9, the end of the control portion 902 may be separated in time from the beginning of the UL data portion 904. This time separation may be referred to as a gap, guard period, guard interval, and/or various other suitable terms. This separation provides time for the switch-over from DL communication (e.g., reception operation by the scheduling entity) to UL communication (e.g., transmission by the scheduling entity). UL-centric slot 900 may also include a common UL portion 906. The common UL portion 906 in FIG. 9 may be similar to the common UL portion 806 described above with reference to FIG. 8. The common UL portion 906 may additionally or alternatively include information pertaining to channel quality indicator (CQI), sounding reference signals (SRSs), and various other suitable types of information. The foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Massive MIMO

Multiple-antenna (multiple-input multiple-output (MIMO)) technology is becoming common for wireless communications and has been incorporated into wireless broadband standards such as long term evolution (LTE), Wi-Fi, and 5G, for example. In MIMO, the more antennas the transmitter/receiver is equipped with, the more the possible signal paths (e.g., spatial streams) and the better the performance in terms of data rate and link reliability. Increased number of antennas can also involve increased complexity of the hardware (e.g., number of radio frequency (RF) amplifier frontends) and increased complexity and energy consumption of the signal processing at both ends.

Massive MIMO may involve the use of a very large number of service antennas (e.g., hundreds or thousands) that can be operated coherently and adaptively. The additional antennas may help focus the transmission and reception of signal energy into smaller regions of space. This can lead to huge improvements in throughput and energy efficiency, in particularly when combined with simultaneous scheduling of a large number of user terminals (e.g., tens or hundreds). Massive MIMO can be applied in time division duplex (TDD) operation and also in frequency division duplex (FDD) operation.

Example Reference Signals and Link Adaptation for Massive MIMO

Link adaptation is the ability to adapt the modulation scheme and the coding rate of the error correction according to the quality of the radio link. In some cases, link adaption may performed by the base station (BS) (e.g., BS 110) based on feedback information received from the user equipment (UE) e.g., UE 120).

Example Reciprocity-based Link Adaptation

Figure 10:
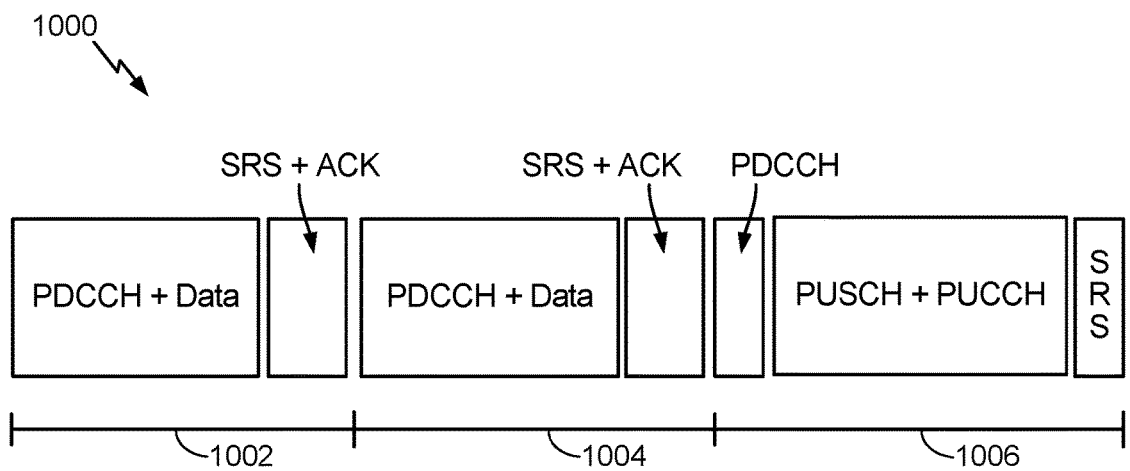
FIG. 10 is a transmission timeline for an example reciprocal link adaption procedure, in accordance with certain aspects of the present disclosure.

FIG. 10 is a transmission timeline for an example reciprocal link adaption approach, in accordance with certain aspects of the present disclosure. As shown in FIG. 10, in the reciprocal link adaption approach, the UE sends sounding reference signals (SRS) are sent in the uplink part of subframes 1002, 1004, and 1006. Based on the SRS, the wireless node (e.g., BS) can estimate the channel H and predict the rank and rates the UE can receive. The BS transmits to the UE in the physical downlink control channel (PDCCH) and/or data part of the subframes.

The estimated channel H can be whitened with the last Rnn report (information regarding channel covariance matrix over interference from neighboring cells) received from the UE. Rnn feedback may be a matrix the size of the number of subbands x the number of UE antennas squared. Alternatively, the UE can sound through $Rnn^{-1/2}$. The BS can derive precoders/rate from single value decomposition (SVD) of H. The BS may need to know the transmit power of the UE.

Reciprocity-based MIMO depends on uplink SRS signaling and interference information from the UE (e.g., accurate Rnn feedback). However, in a multi-user/multi-cell scenario, depending on which UEs the scheduler serves, the interference seen by the UE, and thus the interference feedback from the UE, Rnn, can be a time varying quantity. For example, the Rnn may change significantly each subframe because the sets of users being scheduled can change each subframe.

Therefore, techniques and apparatus for reference signals and link adaption for massive MIMO are desirable.

According to certain aspects, well-structured channel state information reference signals (CSI-RS) can better address subframe dynamics and improve reporting accuracy. Techniques are provided herein for link adaptation using CSI-RS provided according to various options.

According to certain aspects, the BS may derive precoders for users and streams from uplink SRS from one or more UEs (or selected from other criterion/open loop). The BS can send CSI-RS to the UE according to the selected precoders and data may be later transmitted. The UE can look at the quality of the CSI-RS and determine a modulation coding scheme (MCS) the UE can actually receive and may feedback that information to the BS. The CSI-RS can be used by the UE to then determine channel quality information (CQI), rank indicator (RI) feedback, and/or Rnn feedback. The UE can also send an additional precoder correction matrix, along with the feedback, to rotate transmission for the next burst.

Example Hybrid SRS and Precoded CSI-RS Link Adaptation

Figure 11:
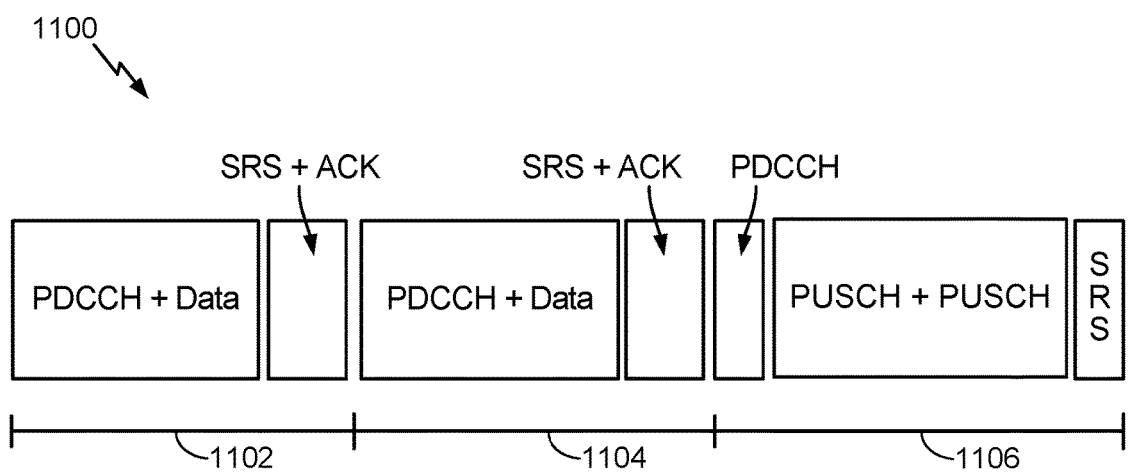
FIG. 11 is a transmission timeline for an example hybrid link adaption procedure, in accordance with certain aspects of the present disclosure.

FIG. 11 is a transmission timeline for an example hybrid link adaption approach, in accordance with certain aspects of the present disclosure. As shown in FIG. 11, in subframe 1102, the BS can estimate the channel H based on SRS received from the UE on the uplink and determine a precoder (e.g., beamforming) matrix V for CSI-RS derived from the channel estimate H using SVD. On the downlink, the BS can send the CSI-RS to the UE according to the precoders V in subframe 1104. The UE may observe the CSI-RS through HV and predict rate based on receiver capabilities. The UE can send phase correction matrix $\tilde{V}$ and CQI information to the BS in the uplink in subframe 1106. The phase correction matrix $\tilde{V}$ can indicate a rotation amount for the BS to rotate the precoder matrix V for the next transmission. Although not shown in FIG. 11, the BS can serve the UE in the next downlink subframe with modulation and rate based on the reported CQI from the UE.

For reciprocity-based link adaptation, SRS uplink bursts may be a few symbols for processing gain. The BS may use the transmit power of the SRS in order to estimate path loss. The BS may use the Rnn feedback (number of subbands x number of UE antennas^2). According to certain aspects, if SRS is beamformed to reflect Rnn, the Rnn overhead can be reduced.

For hybrid SRS and CSI-RS link adaption approach, SRS uplink bursts may be a few symbols for processing gain and the BS may use the transmit power of the SRS in order to estimate path loss, similar to the reciprocity-based link adaption approach. However, Rnn feedback may use relaxed accuracy (e.g., noise floor) and may be used only at initialization. Also, precoder correction matrix $\tilde{V}$ feedback can be reduced by sending a skewed symmetric Logm($\tilde{V}$).

Figure 12:
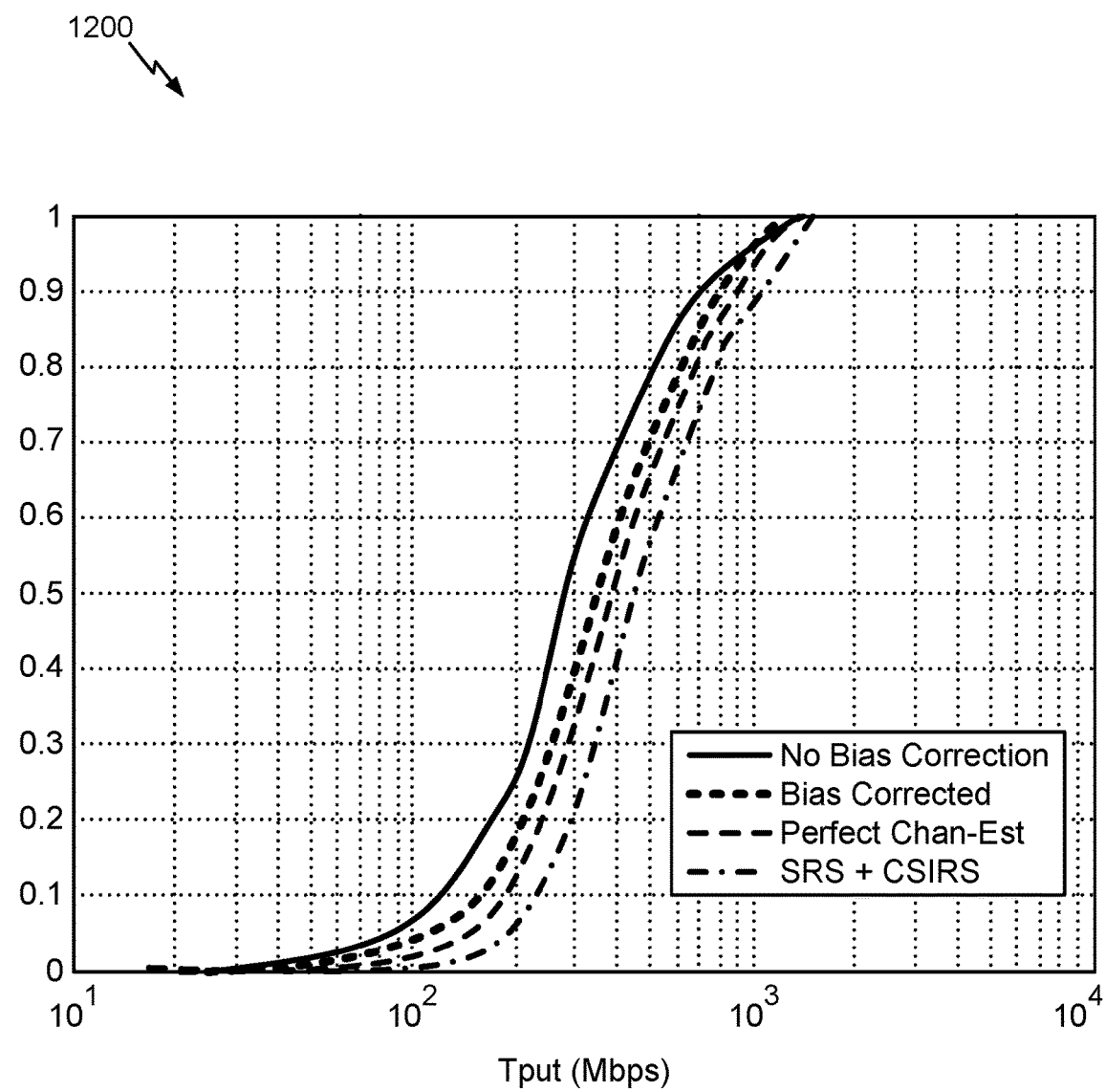
FIG. 12 is a graph showing example performance of different link adaptation procedures, in accordance with certain aspects of the present disclosure.

FIG. 12 is a graph 1200 showing example performance of reciprocity-based link adaptation compared to hybrid SRS and precoded CSI-RS link adaption, in accordance with certain aspects of the present disclosure. As shown in FIG. 12, performance gains may be realized from precoder correction and more accurate rate and rank requests. Performance of reciprocity-based link adaptation may be limited by accuracy of Rnn feedback and precoder/rate prediction affected by noisy uplink channel estimation and/or calibration error (some bias corrections at base station can compensate for uplink channel estimation). In contrast, for hybrid SRS and precoded CSI-RS based link adaption, the rate/CQI request can more accurately account for Rnn at the UE since quantization for uplink reporting is not required. Further, rank estimation can be more accurate at the UE since no bias correction is needed at the base station. Also, precoder correction can be sent based on CSI-RS, and may compensate for uplink estimation error.

Example MU-MIMO Scheduling

For MU-MIMO scheduling, user/stream groups and precoder directions may be determined. MU-MIMO user beams $w_i$ can be scheduled to account for signal-to-leakage ratio (SLR). SLR is the ratio of signal power on stream to interference caused to co-scheduled streams.

UEs may send SRS for the network (e.g., the BS) to use for MU-MIMO scheduling. Optionally, the UE can provide some Rnn feedback. Next, the network may estimate $H_j$ for each user j and take SVD of the channel whitened with Rnn. Eigenvalues and transmit eigenvectors can be used for initial precoder candidates in scheduling. The network may be configured to ignore streams where $\|h_{ij}\|^2 < N_{rx}\sigma^2$ for more than x percent of the tones, where x may be configurable (e.g., 40%). The network may then select users and modify final precoders to be used for transmission.

User selection/grouping and final precoder calculation may be performed according an iterative approach or a "greedy" user grouping approach. For the iterative approach, for each unscheduled stream in the cell, the stream may added to schedule_set; precoding vectors may be updated to maximize SLR metric. The rate for every user in schedule_set may be re-estimated (e.g., may recompute from SVD or just scale from SLR). The sum utility $$\sum_{i=1}^{N} \frac{R_i}{T_i}$$

may be computed from the estimated rates $R_i$. The unscheduled stream that gives the maximum sum utility may be chosen and set as current_utility and if current_utility>γ·previous_utility (currently using γ=1.1 (Baseline), and 1.03) the stream may be added to schedule_set and previous_utility can be set equal to current_utility. For the greedy user grouping approach, all remaining streams may be ranked based on Rate(hij)/Tput(j) for ith stream on jth user. The BS may initialize schedule set=[ ] and sequentially evaluate each stream order. For stream i, if $$\frac{\sum_{j:schedule\_set} |h_i^* h_j|}{\|h_i\|^2} < \theta,$$

stream i may be added to schedule_set (baseline θ=0.5, also use 0.7), otherwise continue to next stream (until done). Precoding vectors may be updated to maximize SLR for all streams that were selected.

Figure 13:
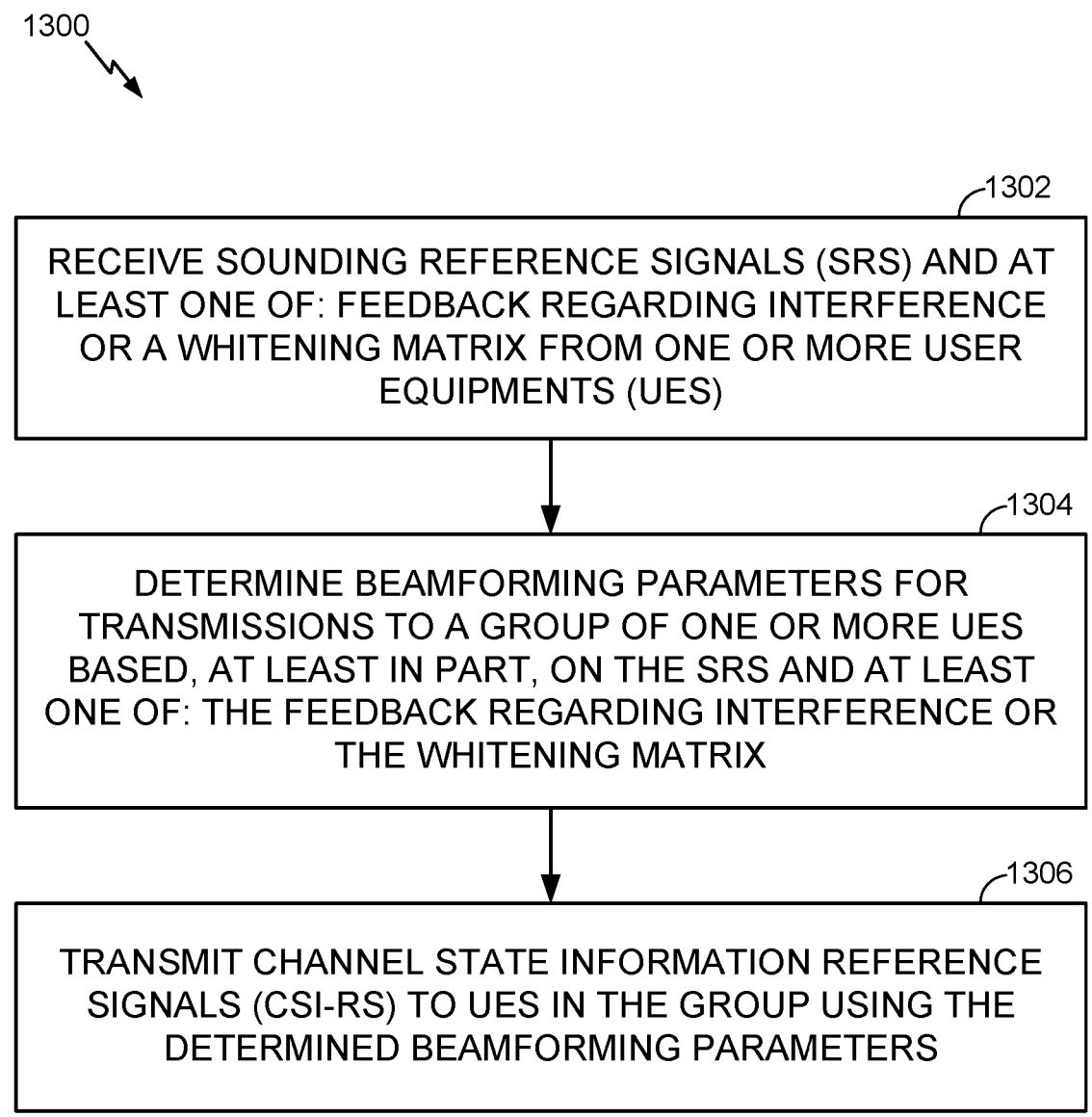
FIG. 13 is a flow diagram illustrating example operations for wireless communications that may be performed, for example, by a BS, in accordance with certain aspects of the present disclosure.

FIG. 13 is a flow diagram illustrating example operations 1300 for wireless communications, in accordance with certain aspects of the present disclosure. The operations 1300 may be performed, for example, by a wireless node such as a BS (e.g., BS 110). The operations 1300 may begin, at 1302, by receiving SRS and at least one of: feedback regarding interference or a whitening matrix from one or more UEs. At 13904, the BS determines beamforming parameters for transmissions to a group of one or more UEs based, at least in part, on the SRS and at least one of: the feedback regarding interference or the whitening matrix. And at 1306, the BS transmits CSI-RS to UEs in the group according to the determined beamforming parameters.

Figure 14:
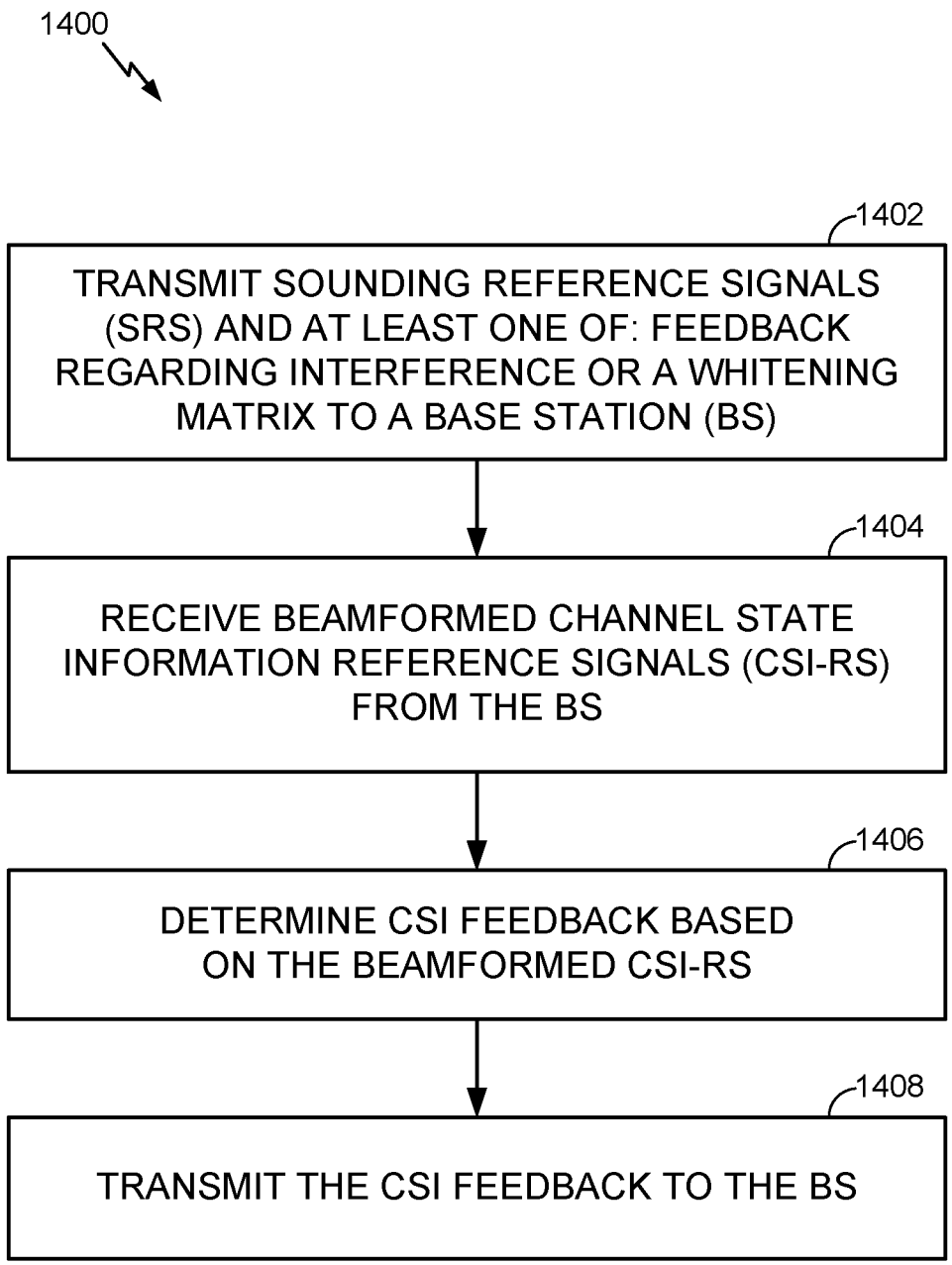
FIG. 14 is a flow diagram illustrating example operations for wireless communications that may be performed, for example, by a UE, in accordance with certain aspects of the present disclosure.

FIG. 14 is a flow diagram illustrating example operations 1400 for wireless communications, in accordance with certain aspects of the present disclosure. The operations 1400 may be performed, for example, by a wireless node such as a UE (e.g., UE 120). The operations 1400 may begin, at 1402, by transmitting SRS and at least one of: feedback regarding interference or a whitening matrix to a BS. At 1404, the UE receives beamformed CSI-RS from the BS. At 1406, the UE determines CSI feedback based on the CSI-RS. At 1408, the UE transmits the CSI feedback to the BS.

Example CSI-RS in Downlink-Centric Subframes

Figure 15:
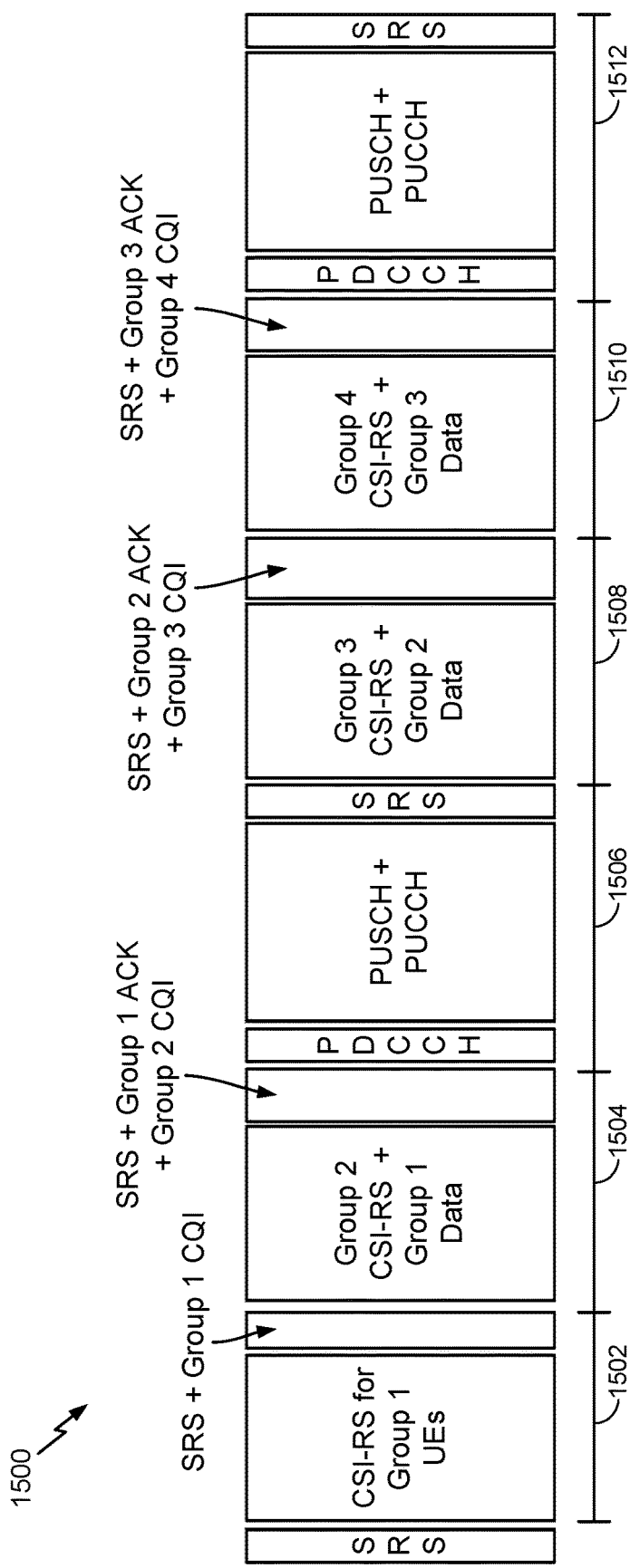
FIG. 15 is a transmission timeline for an example link adaption procedure with channel state information reference signals (CSI-RS) transmitted in downlink-centric subframes, in accordance with certain aspects of the present disclosure.

FIG. 15 is a transmission timeline 1500 for an example link adaption procedure with CSI-RS transmitted in downlink-centric subframes, in accordance with certain aspects of the present disclosure. As shown in FIG. 15, the scheduler (e.g., the BS) determines user grouping (e.g., UEs, rank, etc.) back on SRS and CQI received from the UE. In subframe 1502, which may be a downlink-centric subframe having a greater number of resources allocated for downlink than for uplink, the BS sends precoded CSI-RS for the scheduled UEs.

As shown in FIG. 15, the UE can provide feedback (e.g., CQI/RI, Rnn) in an uplink portion of the downlink-centric subframe 1502. Based on the feedback from the UE, the BS can then select a second group of UEs to schedule. In the downlink portion of the subframe 1504, which may another downlink-centric subframe, the BS can CSI-RS for the Group 2 UEs and can send data for the Group 1 UEs. In the uplink portion (e.g., an uplink burst), the Group 2 UEs can send CQI feedback and the Group 1 UEs can send ACK/NACK information for the data.

As shown in FIG. 15, the next subframe 1506 may be an uplink-centric subframe. The UEs can send uplink PUSCH and PUCCH. The BS can select a third group of UEs to schedule (Group 3 UEs). Thus, there may be a latency of one subframe, since CSI-RS, which is used to allow for interference estimation, is not received until the next downlink-centric subframe.

As shown in FIG. 15, in the downlink-centric subframe 1508 the BS sends CSI-RS for the Group 3 UEs and data for the Group 2 UEs. In the uplink portion of the subframe 1508, the UEs sends SRS, the Group 3 UEs send CQI, and Group 2 UEs send ACK/NACK feedback for the data. The BS and UEs can transmit similarly in subframes 1510, 1512, and so on.

Figure 16:
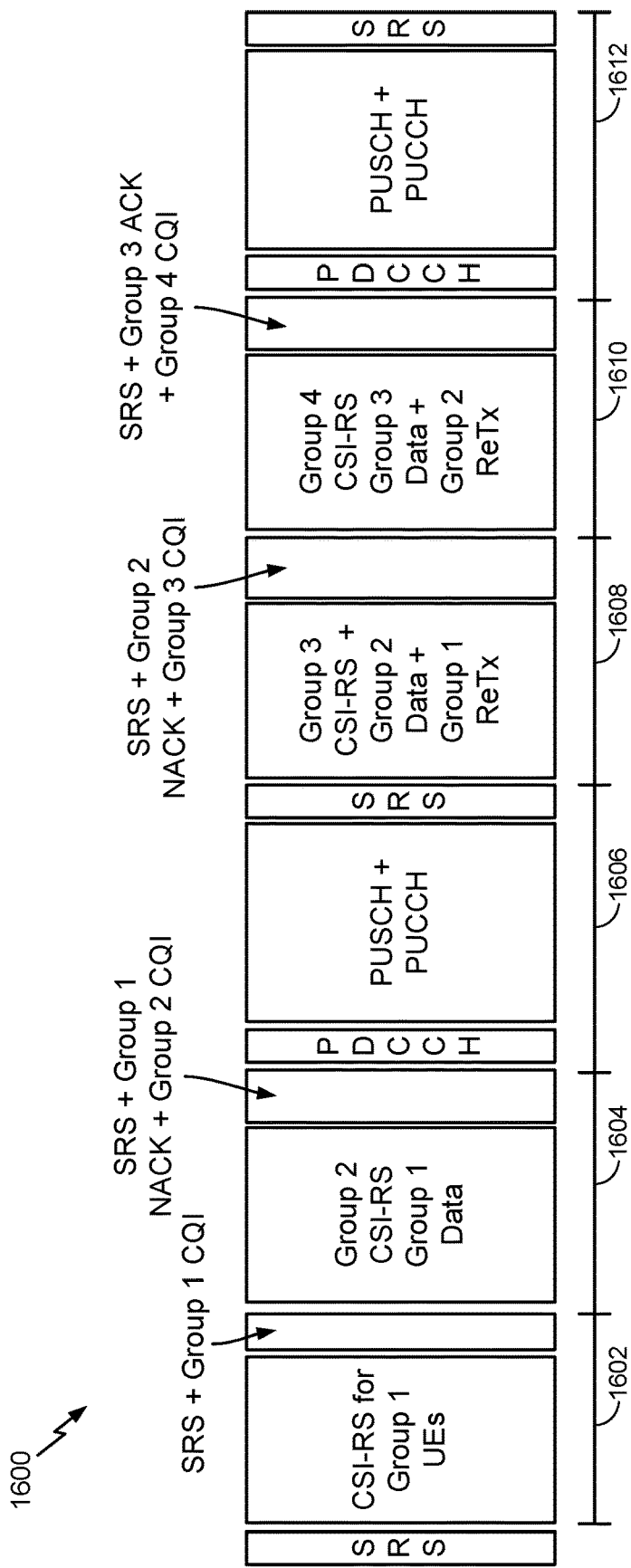
FIG. 16 is a transmission timeline of a retransmission for an example link adaption procedure with CSI-RS transmitted in downlink-centric subframes, in accordance with certain aspects of the present disclosure.

FIG. 16 is a transmission timeline 1600 of a retransmission for an example link adaption procedure including retransmissions in the case that the UEs send a NACK, in accordance with certain aspects of the present disclosure. As shown in FIG. 16, when CSI-RS is transmitted in downlink-centric subframes only (e.g., subframes 1602, 1604, 1608, and 1610), retransmissions may be delayed by 1 subframe. For example, as shown in FIG. 16, the Group 1 UEs may send a NACK in the uplink portion (e.g., uplink burst) of the downlink-centric subframe 1604 for the Group 1 data transmitted in the subframe 1604. Since the next subframe 1606 is an uplink-centric subframe, the retransmission for the Group 1 UEs is not sent until the subframe 1608. CSI-RS is sent again, so that other UEs being scheduled in the same subframe can compute Rnn (and CQI) accurately. CQI feedback from UEs that need retransmission is ignored.

Example CSI-RS in Uplink-Centric Subframes

Figure 17:
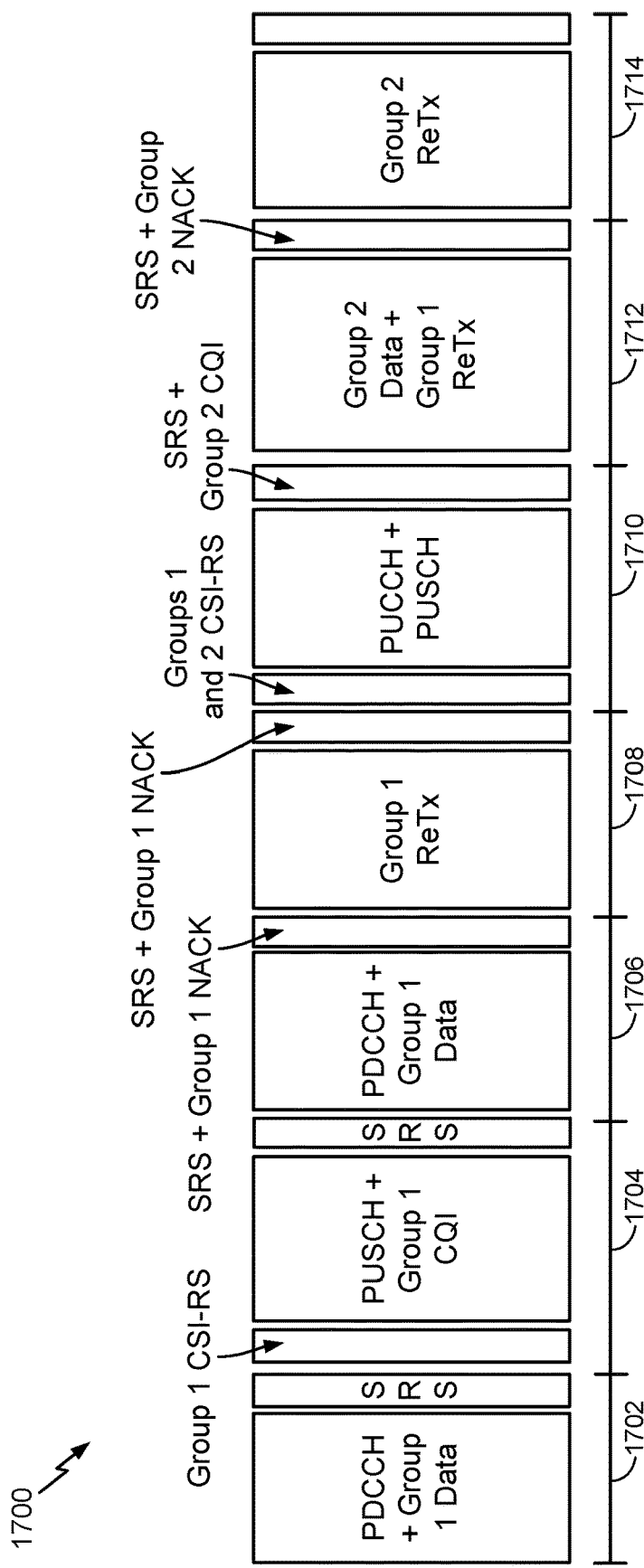
FIG. 17 is a transmission timeline for an example link adaption procedure with CSI-RS transmitted in uplink-centric subframes, in accordance with certain aspects of the present disclosure.

FIG. 17 is a transmission timeline 1700 for an example link adaption procedure with CSI-RS transmitted in uplink-centric subframes, in accordance with certain aspects of the present disclosure. As shown in FIG. 17, in another link adaption procedure, the BS can send CSI-RS in uplink-centric subframes. The UEs can send SRS in the uplink portion of downlink-centric subframe 1702. The scheduler (e.g., the BS) may determine user groupings to schedule. The BS sends the precoded CSI-RS for Group 1 UEs in the downlink burst of the uplink-centric subframe 1704. The scheduling decision may be done once per cycle (e.g., every uplink subframe). CSI-RS may be sent only once in the PDCCH of the uplink-centric subframe. The Group 1 UEs may provide feedback in the uplink portion of the uplink-centric subframe 1704. The BS sends data in the following downlink-centric subframe 1706.

In this case, retransmissions can happen in the very next subframe (e.g., no extra subframe delay, unlike the case of CSI-RS in downlink-centric subframes only). For example, as shown in FIG. 17, in subframe 1708, Group 1 UEs may send a NACK for the Group 1 data in subframe 1708. The BS can send the CSI-RS and schedule the Group 1 UEs for retransmission in the next subframe 1710, even though it is an uplink-centric subframe. Therefore, the BS can send the Group 1 retransmission in the very next subframe 1712.

Bursts arriving during downlink-centric subframes may have to wait for next uplink-centric boundary.

Example CSI-RS in Every Subframe

Figure 18:
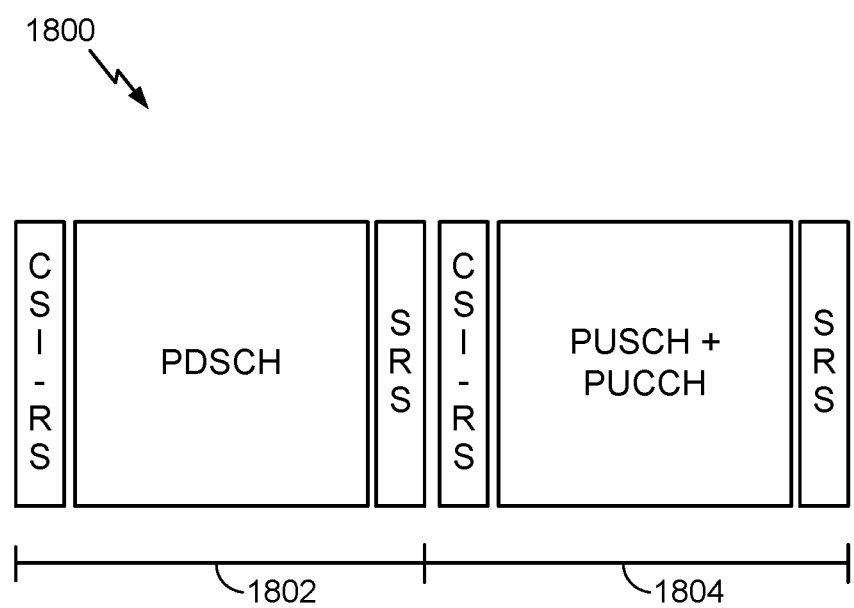
FIG. 18 is a transmission timeline for an example link adaption procedure with CSI-RS transmitted in all subframes, in accordance with certain aspects of the present disclosure.

FIG. 18 is a transmission timeline 1800 for an example link adaption procedure with CSI-RS transmitted in every subframe, in accordance with certain aspects of the present disclosure. As shown in FIG. 18, CSI-RS can be sent the common downlink burst of every subframe, whether a downlink-centric subframe (e.g., subframe 1802) or an uplink-centric subframe (e.g., subframe 1804). According to certain aspects, this can also be leveraged with demodulation reference signals (DM-RS) since user group may be the same depending on the timeline. Anchor frames may be allowed to include anchor reference signals.

Example Differential Precoding of SRS

According to certain aspects, the UEs can send feedback regarding interference information implicitely. For example, the UE can indicate feedback information using the SRS transmissions and the BS can determine the channel estimate H. The BS derives SVD(H)=UDV'. The UE may send a rotated SRS signal. Applying the rotation R results in the BS effectively estimating channel RH. From the previous estimate of H (and its SVD), the BS can derive R=(RH) *V* inv(D)*U'. According to certain aspects, a precoder correction can be used for the rotation matrix R. Similarly, the UEs can send a whitening matrix instead of conveying Rnn feedback.

Example Demodulation Quality Feedback for Link Adaptation

Figure 19:
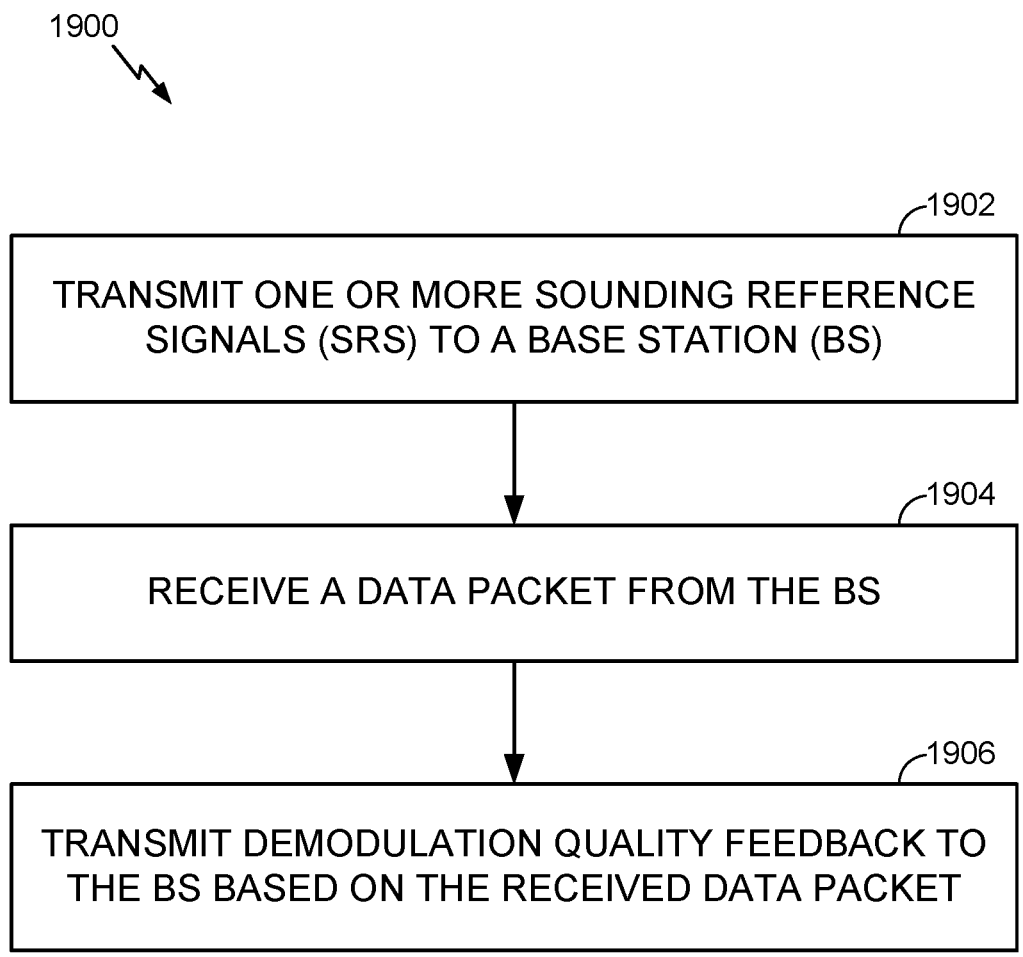
FIG. 19 is a flow diagram illustrating example operations for wireless communications that may be performed, for example, by a UE, for reporting demodulation quality feedback to the BS, in accordance with certain aspects of the present disclosure.

According to certain aspects, the UE can provide feedback related to demodulation quality, based on data received from the BS, which the BS can use for link adaption. FIG. 19 is a flow diagram illustrating example operations 1900 for wireless communications, in accordance with certain aspects of the present disclosure. The operations 1900 may be performed, for example, by a UE. As shown in FIG. 19, the operations 1900 may begin, at 1902, by transmitting one or more SRS to a BS. At 1904, the UE receives a data packet from the BS. At 1906, the UE reports demodulation quality feedback to the BS based on the received data packet. The demodulation quality feedback may be a demodulation quality indicator or demodulation signal to interference plus noise ratio (SINR).

According to certain aspects, the SRS is transmitted in an uplink portion of a first subframe and the data packet is transmitted in a downlink portion of a second downlink-centric subframe. The UE may transmit the ACK/NACK for the data in the uplink portion of the downlink-centric subframe. The demodulation quality feedback is transmitted in the uplink portion of the second subframe and/or transmitted in an uplink portion of a third uplink-centric subframe.

Figure 20:
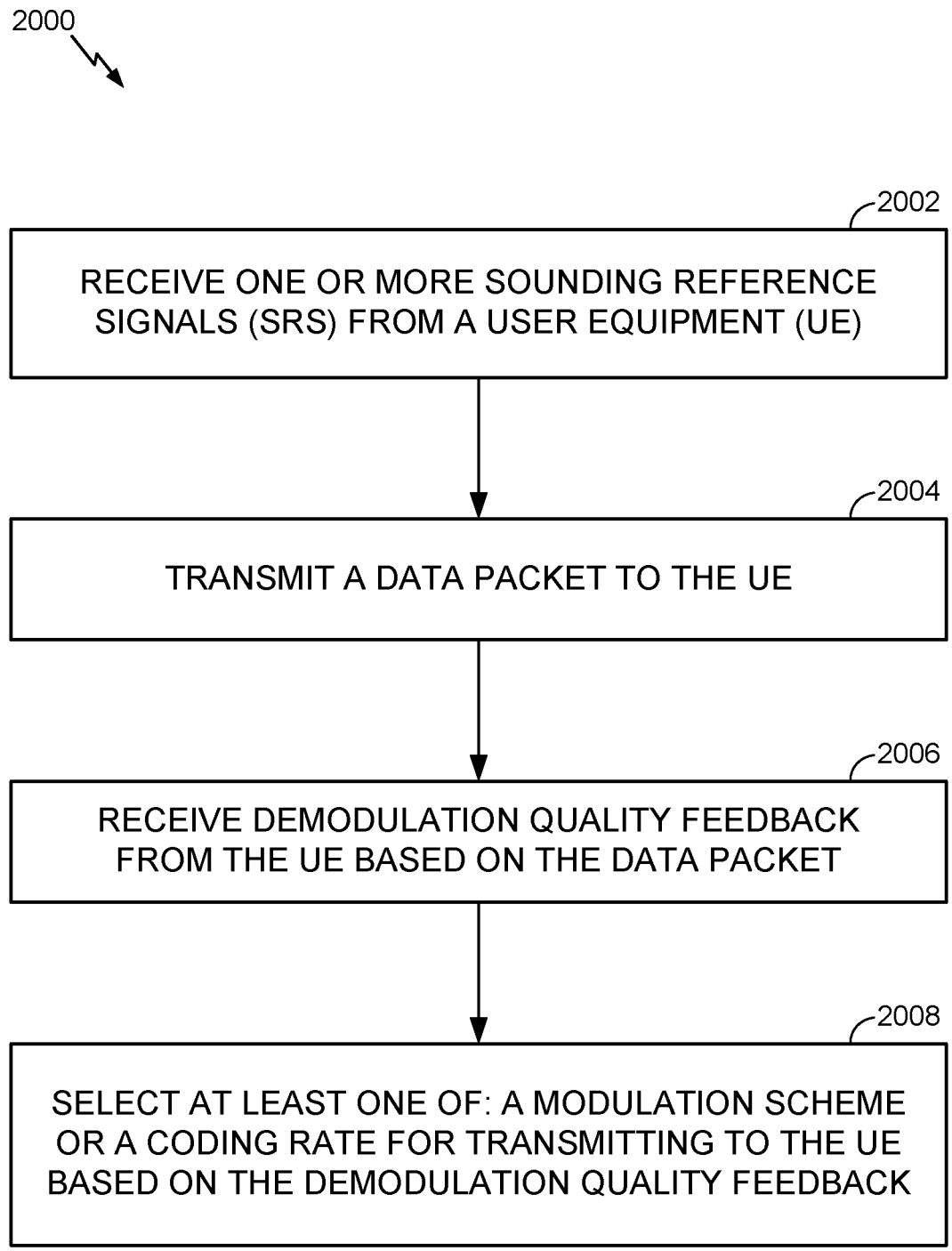
FIG. 20 is a flow diagram illustrating example operations for wireless communications that may be performed, for example, by a BS for performing link adaption based on demodulation quality feedback from the UE, in accordance with certain aspects of the present disclosure.

FIG. 20 is a flow diagram illustrating example operations 2000 for wireless communications, in accordance with certain aspects of the present disclosure. The operations 2000 may be complementary operations performed by the BS to the operations 1900 performed by the UE. The operations 2000 may begin, at 2002 by receiving one or more SRS from a UE. At 2004, the BS transmits a data packet to the UE. At 2006, the BS received demodulation quality feedback from the UE based on the received data packet. At 2008, the BS selects at least one of: a modulation scheme or a coding rate for transmitting to the UE based on the demodulation quality feedback.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in figures, those operations may have corresponding counterpart means-plus-function components.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for transmitting, means for retransmitting, and/or means for sending may comprise a transmitter, which may include the transmit processor 220, the TX MIMO processor 230, the modulator(s) 232a-232t, and/or antenna(s) 234a-234t of the BS 110 illustrated in FIG. 2; the transmit processor 264, the TX MIMO processor 266, the modulator(s) 254a-254r, and/or antenna(s) 252a-252r of the UE 120 illustrated in FIG. 2; and/or the transmitter 510, DSP 520, and/or antenna(s) 516 of the wireless device 502 illustrated in FIG. 5.

Means for receiving may comprise a receiver, which may include the receive processor 238, the MIMO detector 236, the demodulator(s) 232a-232t, and/or antenna(s) 234a-234t of the BS 110 illustrated in FIG. 2; the receive processor 258, the MIMO detector 256, the demodulator(s) 254a-254r, and/or antenna(s) 252a-252r of the UE 120 illustrated in FIG. 2; and/or the receiver 512, DSP 520, signal detector 518, and/or antenna(s) 516 of the wireless device 502 illustrated in FIG. 5.

Means for determining and/or means for performing may comprise a processing system, which may include controller/processor 240 and/or the other processors of the BS 110 illustrated in FIG. 2; the controller/processor 280 and/or other processors of the UE 120 illustrates in FIG. 2; and/or the processor 504 of the wireless device 502 illustrated in FIG. 5.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
    transmitting one or more sounding reference signals (SRS) and at least one of: feedback regarding interference or a whitening matrix to a base station (BS), wherein the one or more SRS is transmitted in an uplink portion of a first subframe;
    receiving one or more beamformed channel state information reference signals (CSI-RS) from the BS, wherein the one or more beamformed CSI-RS is received in a downlink portion of a second subframe, and wherein an amount of resources in the second subframe allocated for downlink transmissions is greater than an amount of resources allocated for uplink transmissions in the second subframe;
    determining CSI feedback based on the beamformed CSI-RS;
    transmitting the CSI feedback to the BS;
    receiving data in a downlink portion of a third subframe;
    receiving another CSI-RS in a downlink portion of a fourth subframe if a negative acknowledgement (NACK) for the data is transmitted; and
    receiving a retransmission of the data in a downlink portion of a fifth subframe in response to the NACK, wherein the fifth subframe comprises a downlink-centric subframe, wherein an amount of resources allocated for downlink transmissions in the fifth subframe is greater than an amount of resources allocated for uplink transmissions in the fifth subframe.

2. The method of claim 1, wherein the CSI feedback comprises at least one of: a channel quality indication (CQI), a rank indicator (RI), the feedback regarding interference, or a phase correction matrix.

3. The method of claim 2, wherein the another CSI-RS has different beamforming parameters based on the phase correction matrix if the CSI feedback comprises the phase correction matrix.

4. The method of claim 1, further comprising determining a rotation for the one or more SRS, wherein transmitting the one or more SRS comprises transmitting the rotated one or more SRS.

5. The method of claim 1, wherein the data comprises precoded data having a same precoding as the one or more beamformed CSI-RS.

6. An apparatus for wireless communications by a user equipment (UE), comprising:
    means for transmitting one or more sounding reference signals (SRS) and at least one of: feedback regarding interference or a whitening matrix to a base station (BS), wherein the one or more SRS is transmitted in an uplink portion of a first subframe;
    means for receiving one or more beamformed channel state information reference signals (CSI-RS) from the BS, wherein the one or more beamformed CSI-RS is received in a downlink portion of a second subframe, and wherein an amount of resources in the second subframe allocated for downlink transmissions is greater than an amount of resources allocated for uplink transmissions in the second subframe;
    means for determining CSI feedback based on the one or more beamformed CSI-RS;
    means for transmitting the CSI feedback to the BS
    means for receiving data in a downlink portion of a third subframe;
    means for receiving another CSI-RS in a downlink portion of a fourth subframe if a negative acknowledgement (NACK) for the data is transmitted; and
    means for receiving a retransmission of the data in a downlink portion of a fifth subframe in response to the NACK, wherein the fifth subframe comprises a downlink-centric subframe, wherein an amount of resources allocated for downlink transmissions in the fifth subframe is greater than an amount of resources allocated for uplink transmissions in the fifth subframe.

7. The apparatus of claim 6, wherein the CSI feedback comprises at least one of: a channel quality indication (CQI), a rank indicator (RI), the feedback regarding interference, or a phase correction matrix.

8. The apparatus of claim 7, wherein the another CSI-RS has different beamforming parameters based on the phase correction matrix if the CSI feedback comprises the phase correction matrix.

9. The apparatus of claim 6, further comprising means for determining a rotation for the one or more SRS, wherein transmitting the one or more SRS comprises transmitting the rotated one or more SRS.

10. The apparatus of claim 6, wherein the data comprises precoded data having a same precoding as the one or more beamformed CSI-RS.

11. An apparatus for wireless communications, comprising:
    a transmitter configured to transmit one or more sounding reference signals (SRS) and at least one of: feedback regarding interference or a whitening matrix to a base station (BS), wherein the one or more SRS is transmitted in an uplink portion of a first subframe;
    a receiver configured to receive one or more beamformed channel state information reference signals (CSI-RS) from the BS, wherein the one or more beamformed CSI-RS is received in a downlink portion of a second subframe, and wherein an amount of resources in the second subframe allocated for downlink transmissions is greater than an amount of resources allocated for uplink transmissions in the second subframe;
    at least one processor coupled with a memory and configured to determine CSI feedback based on the one or more beamformed CSI-RS, wherein:
    the transmitter is further configured to transmit the CSI feedback to the BS; and
    the receiver is further configured to:
        receive data in a downlink portion of a third subframe;
        receive another CSI-RS in a downlink portion of a fourth subframe if a negative acknowledgement (NACK) for the data is transmitted; and
        receive a retransmission of the data in a downlink portion of a fifth subframe in response to the NACK, wherein the fifth subframe comprises a downlink-centric subframe, wherein an amount of resources allocated for downlink transmissions in the fifth subframe is greater than an amount of resources allocated for uplink transmissions in the fifth subframe.

12. The apparatus of claim 11, wherein the data comprises precoded data having a same precoding as the one or more beamformed CSI-RS.

13. The apparatus of claim 11, wherein the CSI feedback comprises at least one of: a channel quality indication (CQI), a rank indicator (RI), the feedback regarding interference, or a phase correction matrix.

14. The apparatus of claim 13, wherein the another CSI-RS has different beamforming parameters based on the phase correction matrix if the CSI feedback comprises the phase correction matrix.

15. The apparatus of claim 11, wherein the at least one processor is configured to determine a rotation for the one or more SRS, wherein transmitting the one or more SRS comprises transmitting the rotated one or more SRS.

16. A non-transitory computer readable medium having computer executable code stored thereon for wireless communications, comprising:
    code for transmitting one or more sounding reference signals (SRS) to a base station (BS) and at least one of: feedback regarding interference or a whitening matrix to a base station (BS), wherein the one or more SRS is transmitted in an uplink portion of a first subframe;
    code for receiving one or more beamformed channel state information reference signals (CSI-RS) from the BS, wherein the one or more beamformed CSI-RS is received in a downlink portion of a second subframe, and wherein an amount of resources in the second subframe allocated for downlink transmissions is greater than an amount of resources allocated for uplink transmissions in the second subframe;
    code for determining CSI feedback based on the one or more beamformed CSI-RS;
    code for transmitting the CSI feedback to the BS;
    code for receiving data in a downlink portion of a third subframe;
    code for receiving another CSI-RS in a downlink portion of a fourth subframe if a negative acknowledgement (NACK) for the data is transmitted; and
    code for receiving a retransmission of the data in a downlink portion of a fifth subframe in response to the NACK, wherein the fifth subframe comprises a downlink-centric subframe, wherein an amount of resources allocated for downlink transmissions in the fifth subframe is greater than an amount of resources allocated for uplink transmissions in the fifth subframe.

17. The non-transitory computer readable medium of claim 16, wherein the data comprises precoded data having a same precoding as the one or more beamformed CSI-RS.

18. The non-transitory computer readable medium of claim 16, wherein the CSI feedback comprises at least one of: a channel quality indication (CQI), a rank indicator (RI), the feedback regarding interference, or a phase correction matrix.

19. The non-transitory computer readable medium of claim 18, wherein the another CSI-RS has different beamforming parameters based on the phase correction matrix if the CSI feedback comprises the phase correction matrix.

20. The non-transitory computer readable medium of claim 16, further comprising code for determining a rotation for the one or more SRS, wherein transmitting the one or more SRS comprises transmitting the rotated one or more SRS.

* * * * *